US012065806B2

(12) United States Patent
Tamai et al.

(10) Patent No.: US 12,065,806 B2
(45) Date of Patent: Aug. 20, 2024

(54) WORK VEHICLE

(71) Applicant: Kubota Corporation, Osaka (JP)

(72) Inventors: Takuya Tamai, Sakai (JP); Junichi Ishikawa, Sakai (JP); Minoru Hiraoka, Sakai (JP)

(73) Assignee: Kubota Corporation, Osaka (JP)

(*) Notice: Subject to any disclaimer, the term of this patent is extended or adjusted under 35 U.S.C. 154(b) by 367 days.

(21) Appl. No.: 17/414,679

(22) PCT Filed: Dec. 12, 2019

(86) PCT No.: PCT/JP2019/048680
§ 371 (c)(1),
(2) Date: Jun. 16, 2021

(87) PCT Pub. No.: WO2020/137581
PCT Pub. Date: Jul. 2, 2020

(65) Prior Publication Data
US 2022/0042280 A1 Feb. 10, 2022

(30) Foreign Application Priority Data

Dec. 27, 2018 (JP) .................. 2018-245767
Dec. 27, 2018 (JP) .................. 2018-245768
Dec. 27, 2018 (JP) .................. 2018-245769

(51) Int. Cl.
*E02F 9/22* (2006.01)
*B60G 17/04* (2006.01)
*B60G 17/056* (2006.01)

(52) U.S. Cl.
CPC ........ *E02F 9/2207* (2013.01); *B60G 17/0432* (2013.01); *B60G 17/0565* (2013.01);
(Continued)

(58) Field of Classification Search
CPC ............ B60G 17/0432; B60G 17/0565; B60G 2500/30
See application file for complete search history.

(56) References Cited

U.S. PATENT DOCUMENTS 4,090,723 A * 5/1978 Hart ................. E02F 9/024
 280/124.128
5,271,632 A * 12/1993 Glaser ................ B60G 9/02
 280/124.112
(Continued)

FOREIGN PATENT DOCUMENTS

CN 103802629 A 5/2014
CN 205601541 U 9/2016
(Continued)

OTHER PUBLICATIONS

Automotive Computer Control, Personant Traffic Press, Feb. 2000, pp. 142-144.

*Primary Examiner* — Faye M Fleming
(74) *Attorney, Agent, or Firm* — The Webb Law Firm

(57) ABSTRACT

A plurality of traveling wheels are supported via expandable/contractible tubular support members to a vehicle body frame. A hydraulic operation type vehicle height adjustment mechanism is provided for each one of the traveling wheels, the vehicle height adjustment mechanism being capable of switching a relative height of the traveling wheel relative to the vehicle body frame within a predetermined length range by expanding/contracting the support member by a hydraulic cylinder. There are provided a hydraulic control valve capable of controlling feeding state of work oil to each one of the plurality of hydraulic cylinders, a controlling section for controlling an operation of the hydraulic control valve to bring the vehicle body to a target state via vehicle height adjustment by the hydraulic cylinder in response to a change in the posture of the vehicle body and a plurality of accu- (Continued)

mulators connected oil chambers of the respective plurality of hydraulic cylinders.

17 Claims, 12 Drawing Sheets

(52) U.S. Cl.
CPC ...... *E02F 9/2217* (2013.01); *B60G 2300/082* (2013.01); *B60G 2500/30* (2013.01)

(56) References Cited

U.S. PATENT DOCUMENTS

| | | | | |
|---|---|---|---|---|
| 7,377,523 B2 * | 5/2008 | Schedgick | ......... | B60G 17/0152 |
| | | | | 280/5.514 |
| 10,625,796 B2 * | 4/2020 | Han | ....................... | B62D 49/08 |
| 10,737,545 B1 * | 8/2020 | Dillenbeck | ............ | B60G 17/08 |
| 2007/0278752 A1 * | 12/2007 | Schedgick | ......... | B60G 17/0416 |
| | | | | 280/5.514 |
| 2022/0258552 A1 * | 8/2022 | Corzani | ................. | A01B 76/00 |

FOREIGN PATENT DOCUMENTS

| | | | | | |
|---|---|---|---|---|---|
| DE | 102005003833 B3 | * | 6/2006 | ......... | B60G 17/0152 |
| GB | 2324512 A | | 10/1998 | | |
| JP | 4191109 A | | 7/1992 | | |
| JP | H05139132 A | * | 6/1993 | ........... | B60G 17/005 |
| JP | 7276956 A | | 10/1995 | | |
| JP | 7276957 A | | 10/1995 | | |
| JP | 10297485 A | | 11/1998 | | |
| JP | 200394907 A | | 4/2003 | | |
| JP | 2007238056 A | | 9/2007 | | |
| JP | 2008247357 A | | 10/2008 | | |
| JP | 20136541 A | | 1/2013 | | |
| WO | WO-2013165102 A1 | * | 11/2013 | ............. | B60G 17/00 |

* cited by examiner

Fig.12
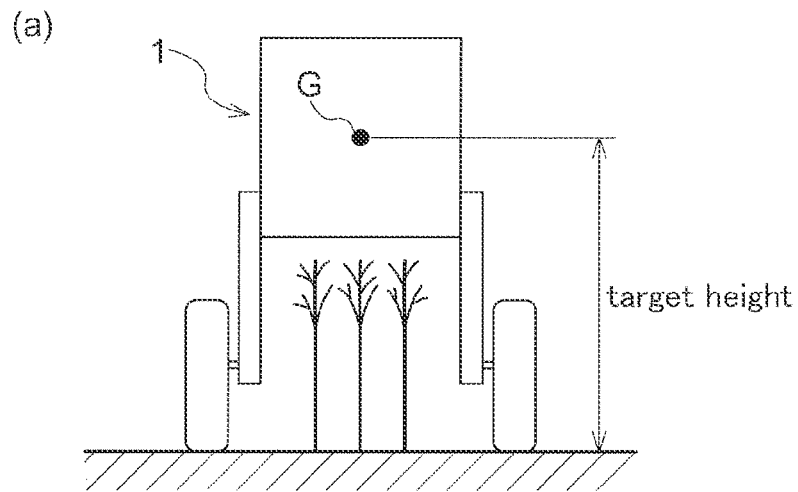
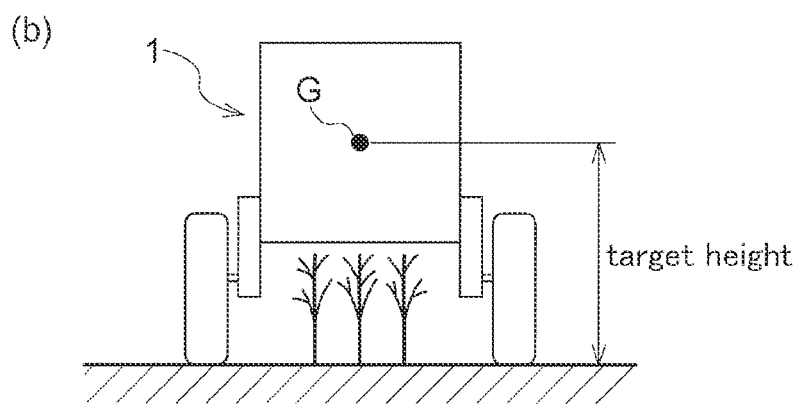
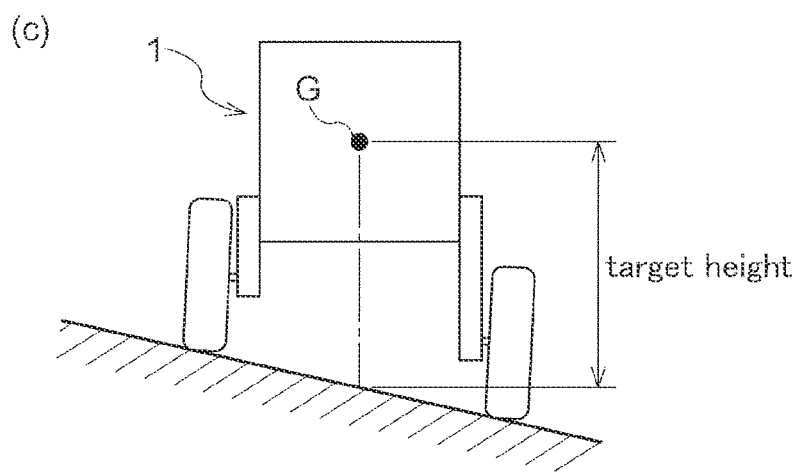

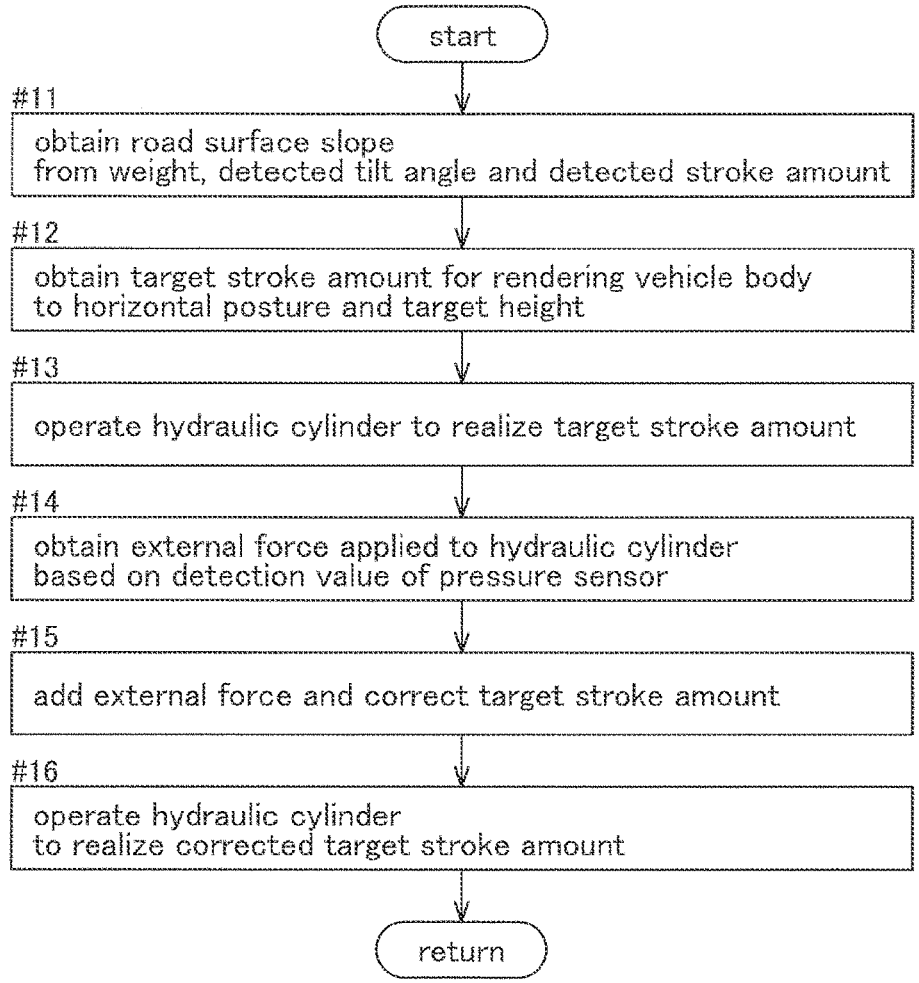
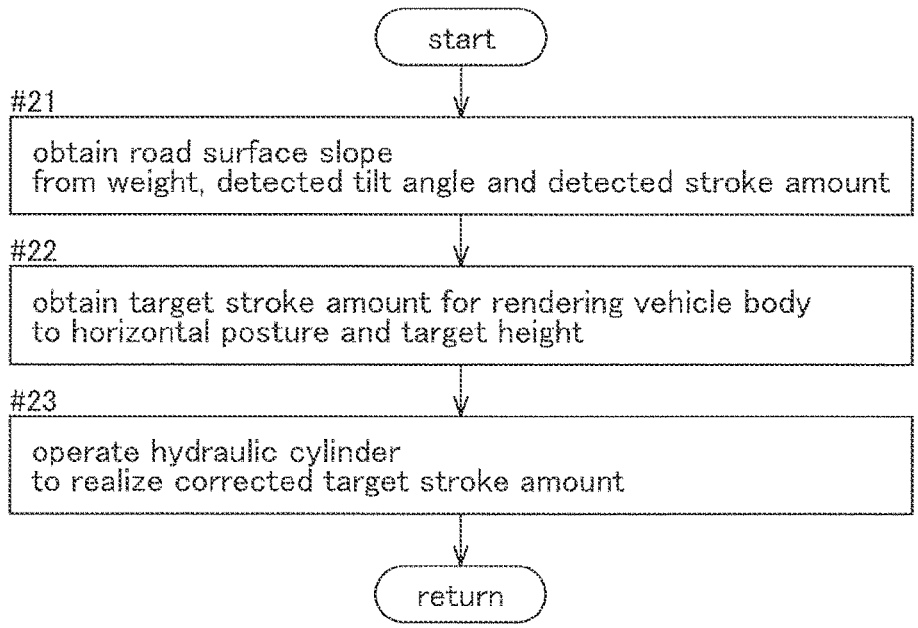

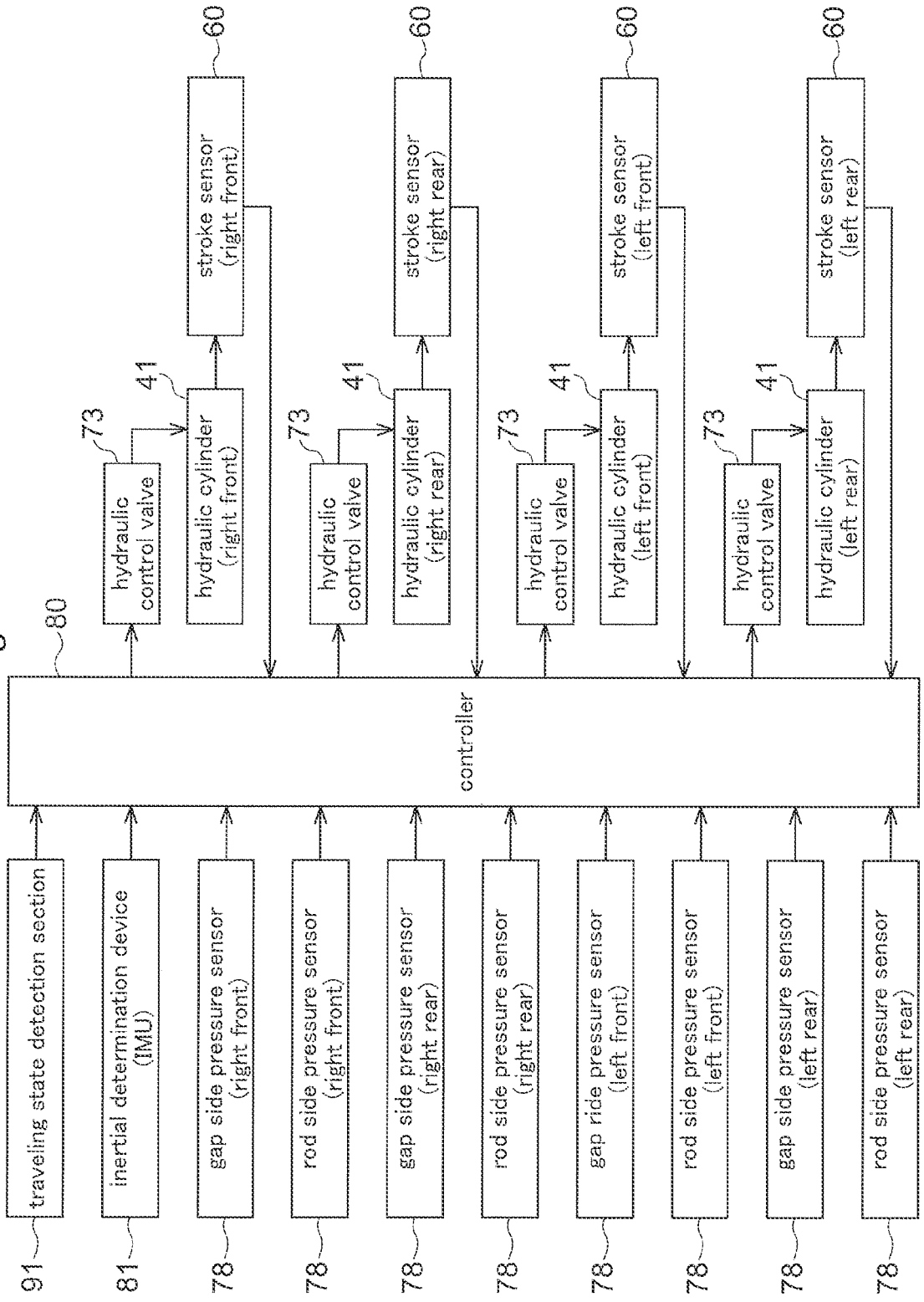

WORK VEHICLE

CROSS-REFERENCE TO RELATED APPLICATIONS

This application is the United States national phase of International Application No. PCT/JP2019/048680 filed Dec. 12, 2019, and claims priority to Japanese Patent Application Nos. 2018-245767 filed Dec. 27, 2018, 2018-245768 filed Dec. 27, 2018, and 2018-245769 filed Dec. 27, 2018, the disclosures of which are hereby incorporated by reference in their entirety.

BACKGROUND OF THE INVENTION

Field of the Invention

The present invention relates to a work vehicle having a plurality of traveling wheels, more particularly to a work vehicle suitable for carrying out a work while traveling astride planted agricultural produces or traveling on a ground surface having unevenness or a slope,

Description of Related Art

In such type of some known work vehicles as above, vertically oriented cases for supporting the traveling wheels are formed long in the vertical direction, so that the vehicle is designed as a high-clearance type having positively increased ground clearance of the vehicle body. The vertical length of the vertically oriented cases is set to a predetermined length (see e.g. Patent Document 1).

With the above-described arrangement, in case e.g. a fertilizing device or a chemical spraying device is mounted to a rear portion of the vehicle body and a work e.g. of feeding fertilizer or chemical agent such as a herbicide to the agricultural produces is carried out, with setting the high ground-clearance of the vehicle body, the work vehicle can travel without its wheels coming into contact with produces planted in a field.

Patent Document 1: Japanese Unexamined Patent Application No. 2003-94907 document.

SUMMARY OF THE INVENTION

With the above-described conventional arrangement, the vertical lengths of the vertically oriented cases are fixedly determined, so that the ground-clearance of the vehicle body when the traveling wheels contact the ground surface is fixed also. Thus, there may arise inconvenience of the ground clearance of the vehicle body becoming insufficient, due to e.g. a difference of growth state of the produces or the kind of produces or a difference of certain working situation. For example, if the ground-clearance of the vehicle body is set in accordance with the situation of the agricultural produces having grown high, the vertical spacing between the vehicle body and the produces may be too large if the produces actually have low profiles. As a result, there would be a risk of the work being not effected favorably, such as scattering of the fertilizer or chemical agent which leads to inability of feeding it to the produces appropriately.

Further, in case a work is carried out while traveling on a ground surface having unevenness, the traveling wheel may enter a recess or ride over a protrusion, which results in tilting of the vehicle body and instability of its posture.

Moreover, with this kind of work vehicle, in addition to the difference of situation of the road surface described above, there is another factor which renders the posture of the vehicle body unstable. For instance, in case the vehicle includes a storage section for storing an amount of chemical agent such as a fertilizer or a herbicide, in association with progress of work, the weight of the storage section changes due to consumption of the agent. And, if the weight of the storage section changes in this way, this may result in variation in the behavior of the posture change.

In addition to such change of the weight of the storage section, there may be application of a force which tends to float the wheels at the front portion of the vehicle body in association with a start of the vehicle body or a force which tends to sink the vehicle body front portion in association with stop of traveling of the vehicle body. Further, when the vehicle body makes a turning traveling, the vehicle body may be exposed to application thereto of a laterally oriented force toward the outer side of the turn. And, this may bring about difference in the behavior of the posture variation.

In view of the above, there has been a need for a work vehicle that allows setting of the ground clearance of the vehicle body in accordance with a difference of work situation or posture variation due to various factors relating to the work or that allows stabilization of the posture of the vehicle body irrespectively of variation in the situation of the road surface.

According to a characterizing feature of a work vehicle relating to the present invention, the work vehicle comprises:

a plurality of traveling wheels supported via expandable/contractible tubular support members to a vehicle body frame;

a hydraulic operation type vehicle height adjustment mechanism provided for each one of the traveling wheels, the vehicle height adjustment mechanism being capable of switching a relative height of the traveling wheel relative to the vehicle body frame within a predetermined length range by expanding/contracting the support member by a hydraulic cylinder;

a hydraulic control valve capable of controlling feeding state of work oil to each one of the plurality of hydraulic cylinders;

a controlling section for controlling an operation of the hydraulic control valve to bring the vehicle body to a target state via vehicle height adjustment by the hydraulic cylinder in response to a change in the posture of the vehicle body; and a plurality of accumulators connected oil chambers of the respective plurality of hydraulic cylinders.

According to the present invention, when the support member is expanded/contracted with activation of the vehicle body height adjustment mechanism, the relative height of the traveling wheel relative to the vehicle body frame can be adjusted variably. And, with execution of such height adjustment for each one of the plurality of traveling wheels, it is possible to change the ground clearance of the vehicle body while maintaining the vehicle body at a desired posture.

The vehicle height adjustment mechanism is configured to expand/contract the support member via activation of the hydraulic cylinder, and the controlling section controls the operation of the hydraulic control valve for the hydraulic cylinder in such a manner to bring the vehicle body into the target state. As a result, for instance, in case the road surface on which the vehicle travels is a sloped land, or the vehicle is to enter a work site across a ridge, or the vehicle advances from the work site to a ridge path across the ridge, as the operations of the plurality of hydraulic cylinders are controlled to bring the vehicle body into the target posture (e.g. horizontal posture), it becomes possible to maintain the posture of the vehicle body under the target posture.

Further, in such a case where the road surface on which the vehicle body travels is a generally flat surface as a whole, but has small unevenness, the traveling wheel may enter a cavity or ride over a protrusion, thus casing vehicle body vibration. In such case, the traveling wheel will rise or fall relative to the vehicle body slightly. However, since an accumulator is connected to the oil chamber of the hydraulic cylinder, as the work oil is absorbed or discharged by the accumulator, relative rising movement of the traveling wheel relative to the vehicle body can be allowed. As a result, vehicle body vibration is suppressed by allowing relative upward/downward movement of the traveling wheel due to small unevenness, whereby the posture of the vehicle body can be maintained under the target posture.

In this way, not only in the case of large posture change of the vehicle body, but also in the case of vibration thereof due to fine and small unevenness, it becomes possible to maintain the posture of the vehicle body under the target posture.

Therefore, according to the present invention, it has become possible to set the ground clearance of the vehicle body to an appropriate height in correspondence with a difference of work situation or to stabilize the posture of the vehicle body, irrespectively of change in the road surface situation.

In the present invention, preferably, the work vehicle further comprises:
a tilt sensor for determining a tilt angle of the vehicle body; and
a plurality of stroke sensors for determining expansion/contraction amounts of the respective plurality of hydraulic cylinders.

With the above-described arrangement, as an actual tilt angle of the vehicle body is determined by the tilt sensor, it is possible to determine accurately to what extent the posture of the vehicle is actually tilted, and also as the expansion/contraction amounts of the hydraulic cylinders are determined, it is possible to determine accurately to what extent the posture of the vehicle is deviated form the target posture. Thus, control for maintaining the posture of the vehicle body under the target posture can be implemented accurately.

In the present invention, preferably, the work vehicle further comprises a pressure sensor for determining a pressure of the oil chamber of the respective plurality of hydraulic cylinders.

With this arrangement, by determining the pressure of the oil chamber of the hydraulic cylinder by the pressure sensor, it becomes possible to estimate a ground-contact state of the traveling wheel relative to the road surface based on e.g. variation in the pressure occurring in association with traveling. More particularly, when the vehicle is traveling with the plurality of traveling wheels being placed in contact with the ground surface, if any one of the traveling wheels enters a recess formed in the ground surface, this results in decrease in the ground contact pressure of this traveling wheel and in corresponding drop in the pressure of the oil chamber of the corresponding hydraulic cylinder. In this, such can be inferred from the determination result of the pressure sensor. Therefore, by e.g. expanding this hydraulic cylinder so that the pressure of the oil chamber of this hydraulic cylinder may be substantially equal to the pressures of the hydraulic cylinders of the other traveling wheels, it becomes possible to travel with all the traveling wheels being placed in contact at an appropriate ground contact pressure with the ground surface. On the other hand, if any one of the traveling wheels rides over a protrusion formed on the road surface, this results in increase of the pressure. So, by contracting the hydraulic cylinder, it becomes possible to travel with all the traveling wheels being placed in contact at an appropriate ground contact pressure with the ground surface.

In this way, based on information on the pressures of the oil chambers, it becomes possible to travel with all the traveling wheels being placed in contact at an appropriate ground contact pressure with the ground surface. As a result, without such disadvantage as idle rotation of the traveling wheel due to its floating, it becomes possible to maintain favorable traveling state.

In the present invention, preferably:
the hydraulic cylinders are constituted of double-action cylinders;
the accumulator is provided for a bottom-side oil chamber and a rod-side oil chamber respectively of the hydraulic cylinder; and
the hydraulic control valve is constituted of a flow control valve capable of variably adjusting a feed flow amount of work oil to the hydraulic cylinder.

With the above-described arrangement, since the operations are effected by the double-action type cylinders, the expanding operation and the contracting operation can be effected speedily respectively. As the bottom-side oil chamber and the rod-side oil chamber are provided respectively with the accumulators, in either the expanding direction or the contracting direction of the hydraulic cylinder, the accumulators can effect absorption and discharge of the oil chamber in a favorable manner, so that vibration of the vehicle body can be suppressed.

When the hydraulic cylinder is operated, in case a deviation between the target operational amount and the current operational amount is large, speedy operation is made possible by feeding a large amount of work oil; whereas in case the deviation is small, posture change can be made in a smooth manner without incurring hunting, etc., by feeding a small amount of work oil.

According to a characterizing feature of a work vehicle relating to the present invention, the work vehicle comprises:
a plurality of traveling wheels supported via expandable/contractible tubular support members to a vehicle body frame;
a hydraulic operation type vehicle height adjustment mechanism provided for each one of the traveling wheels, the vehicle height adjustment mechanism being capable of switching a relative height of the traveling wheel relative to the vehicle body frame within a predetermined length range by expanding/contracting the support member by a hydraulic cylinder;
a hydraulic control valve provided for each one of the vehicle height adjustment mechanisms and capable of controlling a feeding state of work oil to each one of the plurality of hydraulic cylinders included in the respective plurality of vehicle height adjustment mechanisms;
a controlling section for controlling an operation of the hydraulic control valve;
a variation state determining means for determining variation states of the vehicle body from a target ground clearance and from a target posture; and
the controlling section controlling operations of the hydraulic control valves to bring the vehicle body into the target ground clearance and the target posture, based on determination result of the variation state determining means.

According to the present invention, when the support member is expanded/contracted with activation of the vehicle body height adjustment mechanism, the relative height of the traveling wheel relative to the vehicle body frame can be adjusted variably. And, with execution of such height adjustment for each one of the plurality of traveling wheels, it is possible to change the ground clearance of the vehicle body while maintaining the vehicle body at a desired posture.

The vehicle height adjustment mechanism is configured to expand/contract the support member via activation of the hydraulic cylinder, and the controlling section controls the operation of the hydraulic control valve for the hydraulic cylinder. Namely, the variation state determining means determines variation states of the vehicle body from a target ground clearance and from a target posture. Then, based on determination result of the variation state determining means, the controlling section controls operations of the hydraulic control valves to bring the vehicle body into the target ground clearance and the target posture. As a result, the feeding state of the work oil is controlled to expand/contract the hydraulic cylinders, whereby the work vehicle is maintained at the target ground clearance and under the target posture.

In such case of traveling astride planted agricultural produces, the target ground clearance will be set relatively low if the profiles of the agricultural produces are low. Whereas, if the profiles of the agricultural produces are high, the target ground clearance will be set relatively high. With this, work can be carried out in a favorable manner with maintaining the height of the vehicle body at a height suitable for the work in accordance with the profile of the agricultural produces. Further, when traveling on a sloped land, if the target posture is set to a horizontal posture, the plurality of traveling wheels will be placed in contact with the ground surface whereas the vehicle body is changed in its posture to the horizontal posture or to a nearly horizontal posture, whereby traveling under a stable state is made possible.

Therefore, according to the present invention, it has become possible to set the ground clearance of the vehicle body at an appropriate height in accordance with a difference in the work situation and to stabilize the posture of the vehicle body irrespectively of a variation in the ground surface situation.

In the present invention, preferably,
the variation state determining means includes a tilt sensor for determining a tilt angle of the vehicle body and a stroke sensor for determining an expansion/contraction amount of the hydraulic cylinder; and
the controlling section obtains a target operation amount for the hydraulic cylinder for bringing the vehicle body to the target ground clearance and the target posture, based on detection results of the tilt sensor and the stroke sensor and executes vehicle height posture control for controlling the operation of the hydraulic control valve such that detection value of the stroke sensor may become the target operation amount.

With the above-described arrangement, as an actual tilt angle of the vehicle body is determined by the tilt sensor, it is possible to determine accurately to what extent the posture of the vehicle is actually tilted, and also as the expansion/contraction amounts of the hydraulic cylinders are determined by the stroke sensors, it is possible to determine accurately to what extent the posture of the vehicle is deviated form the target posture. As a result, the vehicle height posture control can be implemented in a favorable manner.

In the present invention, preferably:
the variation state determining means includes a tilt sensor for determining a tilt angle of the vehicle body, a stroke sensor for determining an expansion/contraction amount of the hydraulic cylinder and a pressure sensor for determining a pressure of the oil chamber of the hydraulic cylinder; and
the controlling section obtains a target pressure for the hydraulic cylinder required to bring the vehicle body to a target ground clearance and a target posture, based on detection results of the tilt sensor and the stroke sensor, and the controlling section executes pressure adjustment control for controlling operation of the hydraulic control valve such that detection value of the pressure sensor may become the target pressure.

With the above-described arrangement, the controlling section obtains, as the control target value in operating the hydraulic cylinder, not a target operation amount of the hydraulic cylinder, but a target pressure of the hydraulic cylinder needed to bring the vehicle body to the target ground clearance and the target posture. This pressure corresponds to a force (propelling force) needed to operate the hydraulic cylinder by a required stroke amount.

For instance, in the case of controlling a hydraulic cylinder by a target operation amount, there is a risk of hunting occurring in the controlling operation, which will render the control movement unstable. On the other hand, with control via the pressure, as this differs from such physical values as a stroke amount or a tilt angle which are detected directly, the risk of hunting or the like is lessened, so that the control can be stabilized easily.

In the present invention, preferably:
the variation state determining means includes a tilt sensor for determining a tilt angle of the vehicle body, a stroke sensor for determining an expansion/contraction amount of the hydraulic cylinder and a pressure sensor for determining a pressure of an oil chamber of the hydraulic cylinder; and
the controlling section obtains a target operation amount for the hydraulic cylinder for bringing the vehicle body to the target ground clearance and the target posture, based on detection results of the tilt sensor and the stroke sensor and executes vehicle height adjustment control for controlling an operation of the hydraulic control valve and corrects the target operation amount based on variation of pressure determined by the pressure sensor at time of execution of the vehicle height adjustment control.

With the above-described arrangement, as an actual tilt angle of the vehicle body is determined by the tilt sensor, it is possible to determine accurately to what extent the posture of the vehicle is actually tilted, and also as the expansion/contraction amount of the hydraulic cylinder is determined by the stroke sensor, it is possible to determine accurately to what extent the posture of the vehicle is deviated from the target posture. Thus, vehicle height posture control can be implemented in a favorable manner.

Further, by determining the pressure of the oil chamber of the hydraulic cylinder by the pressure sensor, the arrangement is made to correct the target operation amount. With such pressure information, it becomes possible to e.g. estimate a ground-contact state of the traveling wheel relative to the road surface based on e.g. variation in the pressure occurring in association with traveling.

More particularly, when the vehicle is traveling with the plurality of traveling wheels being placed in contact with the ground surface, if any one of the traveling wheels enters a recess formed in the ground surface, this results in decrease in the ground contact pressure of this traveling wheel and in corresponding drop in the pressure of the oil chamber of the corresponding hydraulic cylinder. In this, such can be inferred from the determination result of the pressure sensor. Therefore, by e.g. expanding this hydraulic cylinder so that the pressure of the oil chamber of this hydraulic cylinder may be substantially equal to the pressures of the hydraulic cylinders of the other traveling wheels, it becomes possible to travel with all the traveling wheels being placed in contact at an appropriate ground contact pressure with the ground surface. On the other hand, if any one of the traveling wheels rides over a protrusion formed on the road surface, this results in increase of the pressure. So, by contracting the hydraulic cylinder, it becomes possible to travel with all the traveling wheels being placed in contact at an appropriate ground contact pressure with the ground surface.

In this way, based on information on the pressure of the oil chamber, it becomes possible to travel with all the traveling wheels being placed in contact at an appropriate ground contact pressure with the ground surface. As a result, without such disadvantage as idle rotation of the traveling wheel due to its floating, it becomes possible to maintain favorable traveling state.

According to a characterizing feature of a work vehicle relating to the present invention, the work vehicle comprises:

a plurality of traveling wheels supported via expandable/contractible tubular support members to a vehicle body frame;

a hydraulic operation type vehicle height adjustment mechanism provided for each one of the traveling wheels, the vehicle height adjustment mechanism being capable of switching a relative height of the traveling wheel relative to the vehicle body frame within a predetermined length range by expanding/contracting the support member by a hydraulic cylinder;

a load accommodation device mounted and supported on the vehicle body, the load accommodation device accommodating a load whose weight varies in association with continuation of a work;

a hydraulic control valve capable of controlling a feeding state of work oil to each one of the plurality of hydraulic cylinders;

a controlling section for controlling an operation of the hydraulic control valve; and an accommodation amount determining means for determining an accommodation amount of the load; and the controlling section obtaining a target operation amount for the hydraulic cylinder required for stabilizing a weight balance of the vehicle body based on determination result of the accommodation amount determining means and controlling operation of the hydraulic control valve so that an operation amount of the hydraulic cylinder may become the target operation amount.

According to the present invention, when the support member is expanded/contracted with activation of the vehicle body height adjustment mechanism, the relative height of the traveling wheel relative to the vehicle body frame can be adjusted variably. And, with execution of such height adjustment of each one of the plurality of traveling wheels, it is possible to change the ground clearance of the vehicle body while maintaining the vehicle body at a desired posture.

The weight of the load accommodated in the load accommodation device varies in association with continuation of a work. With such variation of the weight, the posture variation of the vehicle body will differ in its mode. However, the accommodation amount of the load is determined by the accommodation amount determining means and the result of this determination is reflected in the operation control of the hydraulic cylinder by the controlling section.

Namely, the controlling section obtains a target operation amount of the hydraulic cylinder required for stabilizing a weight balance of the vehicle body based on determination result of the accommodation amount determining means. For instance, if the load accommodation device is provided at a rear portion of the vehicle body, in case the accommodation amount is large, this results in rear-heavy weight balance, so the target operation amount of the hydraulic cylinder will be set to correct this.

The vehicle height adjustment mechanism is configured to expand/contract the support member via activation of the hydraulic cylinder, and the controlling section controls the operation of the hydraulic control valve for the hydraulic cylinder in such a manner to bring the operation amount of the hydraulic cylinder into agreement with the target operation amount. As a result, in such case of traveling astride planted agricultural produces, the target ground clearance will be set relatively low if the profiles of the agricultural produces are low. Whereas, if the profiles of the agricultural produces are high, the target ground clearance will be set relatively high. With this, work can be carried out in a favorable manner with maintaining the height of the vehicle body at a height suitable for the work in accordance with the profile of the agricultural produces. Further, when traveling on a sloped land, if the target posture is set to a horizontal posture, the plurality of traveling wheels are placed in contact with the ground surface, whereas the vehicle body is changed in its posture to the horizontal posture or to a nearly horizontal posture, whereby traveling under a stable state is made possible.

Moreover, since the target operation amount is determined based on the accommodation amount of the load as described above, it is possible to control the operation of the hydraulic cylinder with stabilization of the weight balance of the vehicle body. Incidentally, such arrangement of using information of the accommodation amount is particularly effective in the arrangement of controlling an operation of the hydraulic cylinder based on a pressure of the oil chamber of the hydraulic cylinder.

Therefore, according to the present invention, it has become possible to set the ground clearance of the vehicle body at an appropriate height in accordance with variation occurring in the posture due to various factors associated with progress of the work and to stabilize the posture of the vehicle body irrespectively of a variation in the ground surface situation.

In the present invention, preferably, the work vehicle further comprises:

a tilt sensor for determining a tilt angle of the vehicle body; and a stroke sensor for determining an expansion/contraction amount of the hydraulic cylinder;

wherein the controlling section obtains a target operation amount for the hydraulic cylinder for bringing the vehicle body to the target ground clearance and the target posture and required for stabilizing a weight balance of the vehicle body, based on detection results of the tilt sensor and the stroke sensor and executes vehicle height posture control for controlling operation of the hydraulic control valve such that detection value of the stroke sensor may become the target operation amount.

With the above-described arrangement, as an actual tilt angle of the vehicle body is determined by the tilt sensor, it is possible to determine accurately to what extent the posture of the vehicle is actually tilted, and also as the expansion/contraction amount of the hydraulic cylinder is determined by the stroke sensor, it is possible to determine accurately to what extent the posture of the vehicle is deviated form the target posture. And, with addition of the determination result of the accommodation amount determining means to such determination information as above, the target operation amount can be obtained as an appropriate value in accordance with the current work situation, and the vehicle height posture control can be executed in a favorable manner.

According to a characterizing feature of a work vehicle relating to the present invention, the work vehicle comprises:
- a plurality of traveling wheels supported via expandable/contractible tubular support members to a vehicle body frame;
- a hydraulic operation type vehicle height adjustment mechanism provided for each one of the traveling wheels, the vehicle height adjustment mechanism being capable of switching a relative height of the traveling wheel relative to the vehicle body frame within a predetermined length range by expanding/contracting the support member by a hydraulic cylinder;
- a hydraulic control valve capable of controlling a feeding state of work oil to each one of the plurality of hydraulic cylinders;
- a controlling section for controlling an operation of the hydraulic control valve;
- a tilt sensor for determining a tilt angle of the vehicle body; and
- a stroke sensor for determining an expansion/contraction amount of the hydraulic cylinder;
- wherein the controlling section obtains a target operation amount for the hydraulic cylinder for bringing the vehicle body to the target ground clearance and the target posture and required for stabilizing a weight balance of the vehicle body, based on detection results of the tilt sensor and the stroke sensor and executes vehicle height posture control for controlling operation of the hydraulic control valve such that detection value of the stroke sensor may become the target operation amount.

With the above-described arrangement, when the support member is expanded/contracted with activation of the vehicle body height adjustment mechanism, the relative height of the traveling wheel relative to the vehicle body frame can be adjusted variably. And, with execution of such height adjustment of each one of the plurality of traveling wheels, it is possible to change the ground clearance of the vehicle body while maintaining the vehicle body at a desired posture.

The vehicle height adjustment mechanism is configured to expand/contract the support member via activation of the hydraulic cylinder, and the controlling section controls the operation of the hydraulic control valve in such a manner to bring the operation amount of the hydraulic cylinder into agreement with the target operation amount. As a result, in such case of traveling astride planted agricultural produces, the target ground clearance will be set relatively low if the profiles of the agricultural produces are low. Whereas, if the profiles of the agricultural produces are high, the target ground clearance will be set relatively high. With this, work can be carried out in a favorable manner with maintaining the height of the vehicle body at a height suitable for the work in accordance with the profile of the agricultural produces. Further, when traveling on a sloped land, if the target posture is set to a horizontal posture, the plurality of traveling wheels are placed in contact with the ground surface, whereas the vehicle body is changed in its posture to the horizontal posture or to a nearly horizontal posture, whereby traveling under a stable state is made possible.

More particularly, the current tilt angle of the vehicle body is determined by the tilt sensor and the current expansion/contraction amount of the hydraulic cylinder is determined by the stroke sensor and then based on these determination results, there is obtained a target operation amount which realizes the target ground clearance of the vehicle body and which also stabilizes the weight balance of the vehicle body, and the operation of the hydraulic control valve is controlled such that the expansion/contraction amount determined by the stroke sensor may become the target operation amount. The current posture of the vehicle body can be accurately determined by the tilt sensor and the relative posture of the vehicle body relative to the ground surface can be accurately determined by the stroke sensor. Thus, based on these, the target operation amount can be obtained as an appropriate value in accordance with the current work situation and the vehicle height posture control can be effected in a favorable manner.

Incidentally, if the behavior of posture variation becomes different from the previous one due to a certain factor in the course of work traveling, for instance, in the case of change in the traveling state due to e.g. a sudden start or a sudden stop made by the vehicle body or a sharp turn from straight traveling state, etc., the target operation amount of the hydraulic cylinder required for stabilization of the weight balance of the vehicle body may become different. And, in the case of spraying chemical agent, a spraying device (an implement) having a large length in the horizontal direction may sometimes be used in order to secure as large as possible spraying width. In this way, the length may be different. In particular, in case the traveling road surface is a soft and weak ground surface, there may occur a significant posture variation of the vehicle body in such cases.

Then, when the target operation amount of the hydraulic cylinder is to be obtained, the target operation amount of the hydraulic cylinder required for stabilization of the weight balance of the vehicle body is obtained, with taking such situation variation into consideration, to control such that the expansion/contraction amount of the hydraulic cylinder may become the target operation amount.

Therefore, according to the present invention, it has become possible to set the ground clearance of the vehicle body at an appropriate height in accordance with posture variation occurring due to difference of work situation and various factors associated with the work, and to stabilize the posture of the vehicle body irrespectively of a variation in the ground surface situation.

In the present invention, preferably, the work vehicle further comprises a traveling state detection section for detecting a traveling state; and the controlling section obtains the target operation amount for the hydraulic cylinder required for stabilizing the traveling state based on detection result of the traveling state detection section and based on the detection results of the tilt sensor and the stroke sensor, executes the vehicle height posture control for controlling operation of the hydraulic control valve such that the detection value of the stroke sensor may become the target operation amount.

With the above arrangement, a traveling state of the vehicle body is detected by a traveling state detection section. As some examples of traveling state different from previous traveling state, it is possible cite the cases of sudden start or sudden stop made by the vehicle body or a change in the traveling state when a turning traveling is made. And, when the target operation amount for the hydraulic cylinder is to be obtained, the target operation amount for the hydraulic cylinder required for stabilization of the weight balance of the vehicle body is obtained, with taking such change in the traveling state into consideration.

Therefore, by detecting a change in the actual traveling state of the vehicle body associated with work traveling accurately and controlling the operation of the hydraulic cylinder in correspondence with the actual traveling state, it becomes possible to stabilize the posture of the vehicle body.

In the present invention, preferably, the work vehicle further comprises a pressure sensor for determining a pressure of an oil chamber of the hydraulic cylinder: and the controlling section corrects the target operation amount in accordance with variation in the pressure determined by the pressure sensor, in the course of controlling the operation of the hydraulic control valve such that the operation amount of the hydraulic cylinder may become the target operation amount.

With the above arrangement, the pressure of the oil chamber of the hydraulic cylinder is determined by the pressure sensor and the target operation amount is corrected based on the result of this determination. Based on such pressure information, it becomes possible to estimate a ground-contact state of the traveling wheel relative to the road surface based on e.g. variation in the pressure occurring in association with traveling. More particularly, when the vehicle is traveling with the plurality of traveling wheels being placed in contact with the ground surface, if any one of the traveling wheels enters a recess formed in the ground surface, this results in decrease in the ground contact pressure of this traveling wheel and in corresponding drop in the pressure of the oil chamber of the corresponding hydraulic cylinder. In this, such can be inferred from the determination result of the pressure sensor. Therefore, by e.g. expanding this hydraulic cylinder so that the pressure of the oil chamber of this hydraulic cylinder may be substantially equal to the pressures of the hydraulic cylinders of the other traveling wheels, it becomes possible to travel with all the traveling wheels being placed in contact at an appropriate ground contact pressure with the ground surface. On the other hand, if any one of the traveling wheels rides over a protrusion formed on the road surface, this results in increase of the pressure. So, by contracting the hydraulic cylinder, it becomes possible to travel with all the traveling wheels being placed in contact at an appropriate ground contact pressure with the ground surface.

In this way, based on information on the pressure of the oil chamber, it becomes possible to travel with all the traveling wheels being placed in contact at an appropriate ground contact pressure with the ground surface. As a result, without such disadvantage as idle rotation of the traveling wheel due to its floating, it becomes possible to maintain favorable traveling state.

In the present invention, preferably, the work vehicle further comprises:
a driver's seat at which a driver is to be seated; and
an operational member disposed forwardly of the driver's seat.

With the above arrangement, a driver, as being seated at the driver's seat, can drive and operate in a comfortable manner. In such arrangement of a driver being seated as above too, driving operation is facilitated with the stabilization of the posture of the vehicle body.

BRIEF DESCRIPTION OF THE DRAWINGS

FIG. 12 is an operation explanatory diagram,
FIG. 13 is a flowchart of control operations,
FIG. 14 is a flowchart of control operations,
and
FIG. 15 is a control block diagram.

DETAILED DESCRIPTION OF THE PREFERRED EMBODIMENTS

First Embodiment

Next, a work vehicle relating to a first embodiment of the present invention with reference to the accompanying drawings.

General Arrangement

Figure 1:
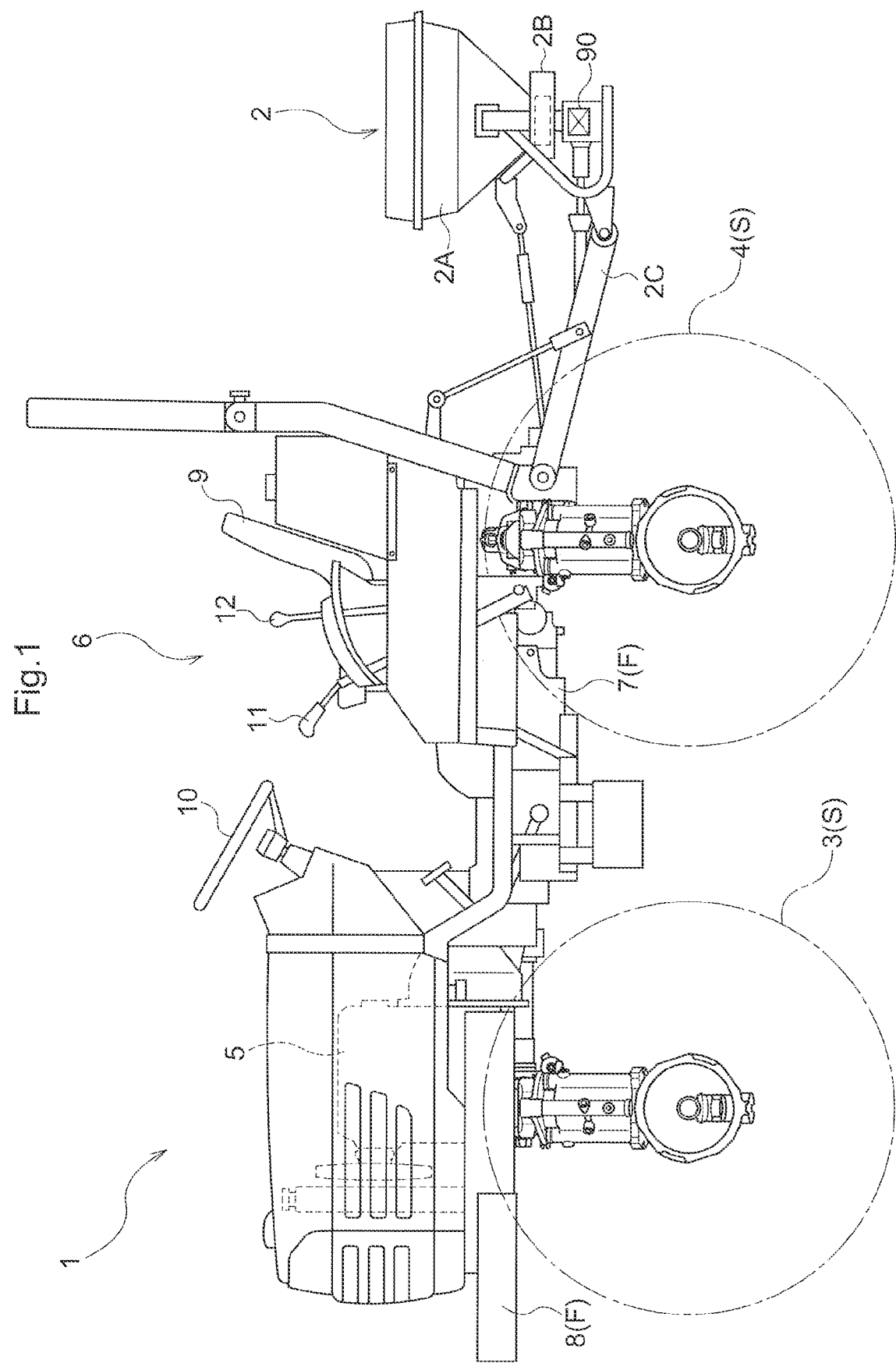
FIG. 1 is an overall side view of a work vehicle.

FIG. 1 shows a riding management machine as an example of a work vehicle relating to this embodiment. This riding management machine includes a chemical spraying device 2 as a load accommodation device mounted at a rear portion of a four-wheel traveling type traveling vehicle body 1. This riding management machine is used for spraying chemical agent onto agricultural produces while traveling astride planting rows of the produces in a field where the agricultural produces are planted in advance. Incidentally, in this embodiment, although there will be explained an exemplary case in which the present invention is applied to a riding management machine (a riding work vehicle), it is noted that the target of application of the present invention is not limited thereto.

On the left and right opposed sides of a front portion of the traveling vehicle body 1, there are provided a pair of front wheels 3 as traveling wheels S which can be steered for making a turn and on the left and right opposed sides of a rear portion of the traveling vehicle body 1, there are provided a pair of rear wheels 4 as traveling wheels S which can be steered for making a turn. In this way, all of the four wheels are steerable and it is possible for example to switch over between a two-wheel maneuvering state in which only the two front wheels 3 are steered and a four-wheel maneuvering state in which the front wheels 3 and the rear wheels 4 are steered in opposite directions to make a turn by a small turning radius.

The front wheels 3 and the rear wheels 4 are provided to be capable of traveling along an inter-row space located between planted produce rows. At a front portion of the traveling vehicle body 1, an engine 5 is mounted. And, at a rear portion of the traveling vehicle body 1, a driving section 6 is mounted. Beneath the traveling vehicle body 1, there is provided a transmission case 7 accommodating an unillustrated speed changer device for speed-changing power of the engine 5. This transmission case 7 extends along the front/rear direction from a rear lower portion of the engine 5 to locations corresponding to the rear wheels 4 as seen in a side view.

On the lower side of the engine 5, there is provided a front portion side frame body 8 to cover an outer circumference portion. As the transmission case 7 and the front portion side frame body 8 are unitarily connected to each other, these together constitute a vehicle body F for supporting the vehicle body as a whole. At the driving section 6, there are provided a driver's seat 9 at which a driver is to be seated and a steering wheel 10 (an operational member) located forwardly of the driver's seat 9 for effecting a steering operation. At this driving section 6, there are also provided a lift lever 11 for lifting up/down the chemical spraying device 2, a speed changer lever 12, etc.

Figure 2:
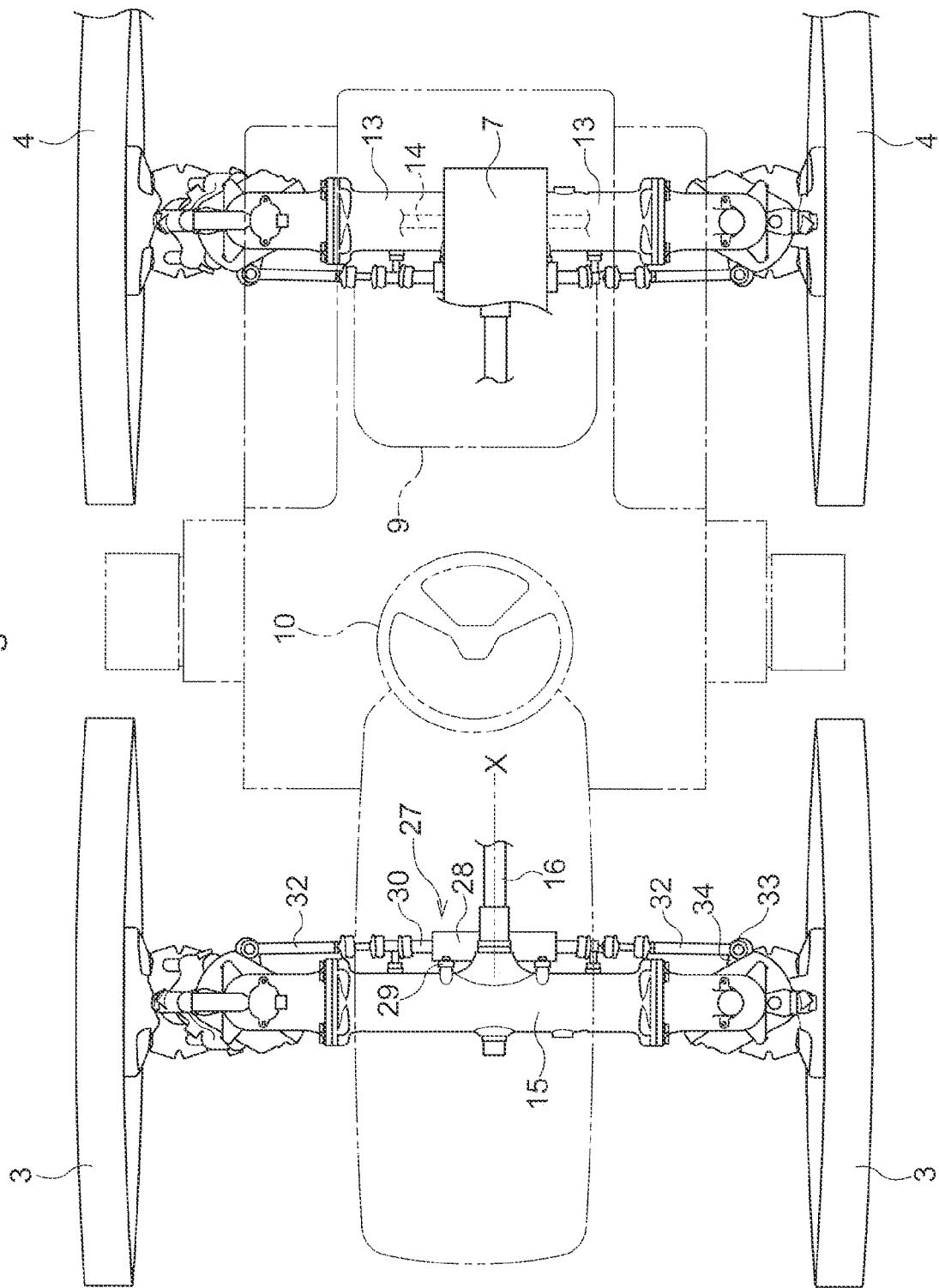
FIG. 2 is a plan view showing a wheel supporting arrangement of the work vehicle.

In the traveling vehicle body 1, the power of the engine 5 is speed-changed by the speed changer device inside the transmission case 7 and then transmitted to the left and right front wheels 3 and the left and right rear wheels 4. Therefore, the traveling vehicle body 1 is configured as a four-wheel drive type in which the four traveling wheels S are driven. As shown in FIG. 2, a horizontally oriented transmission shaft 14 is provided inside a tubular rear horizontally oriented transmission case 13 connected to the left and right opposed sides of the transmission case 7, and the speed-changed power is transmitted via the horizontally oriented transmission shaft 14 to the left and right rear wheels 4. The rear horizontally oriented transmission case 13 is supported to the transmission case 7, namely, the vehicle body frame F.

As shown in FIG. 2, at left/right intermediate portion of the left and right front wheels 3, there is provided a tubular front horizontally oriented transmission case 15, and the power from the transmission case 7 is transmitted to the left and right front wheels 3 via a front/rear oriented intermediate shaft 16, differential mechanisms (not shown) provided inside the front horizontally oriented transmission case 15 and a horizontally oriented transmission shaft 18. The front horizontally oriented transmission case 15 is supported to be capable of rolling (pivoting) about a front/rear axis X which is shared by the intermediate shaft 16, relative to the vehicle body frame F.

Figure 3:
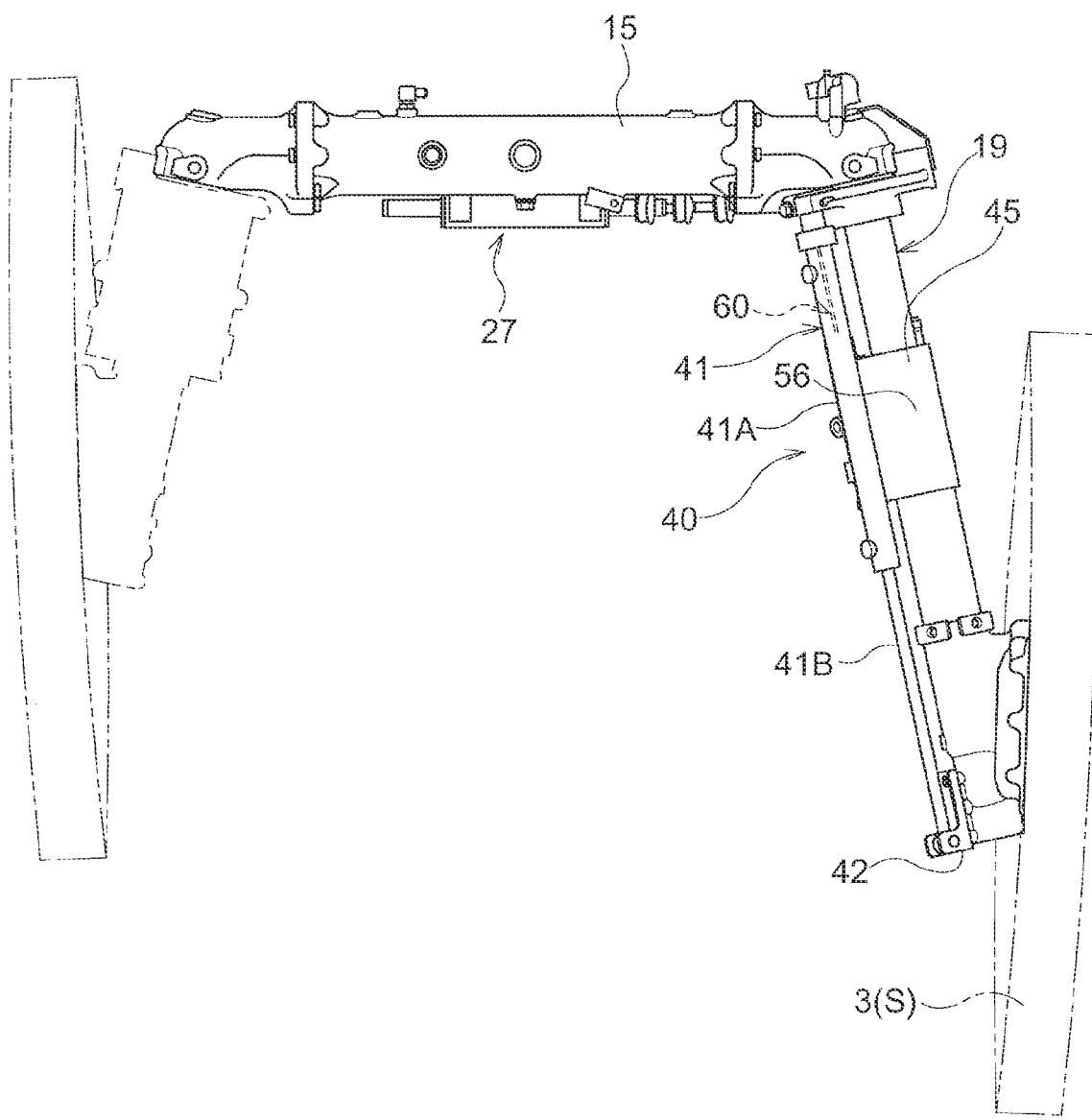
FIG. 3 is a front view showing the wheel supporting arrangement.
Figure 6:
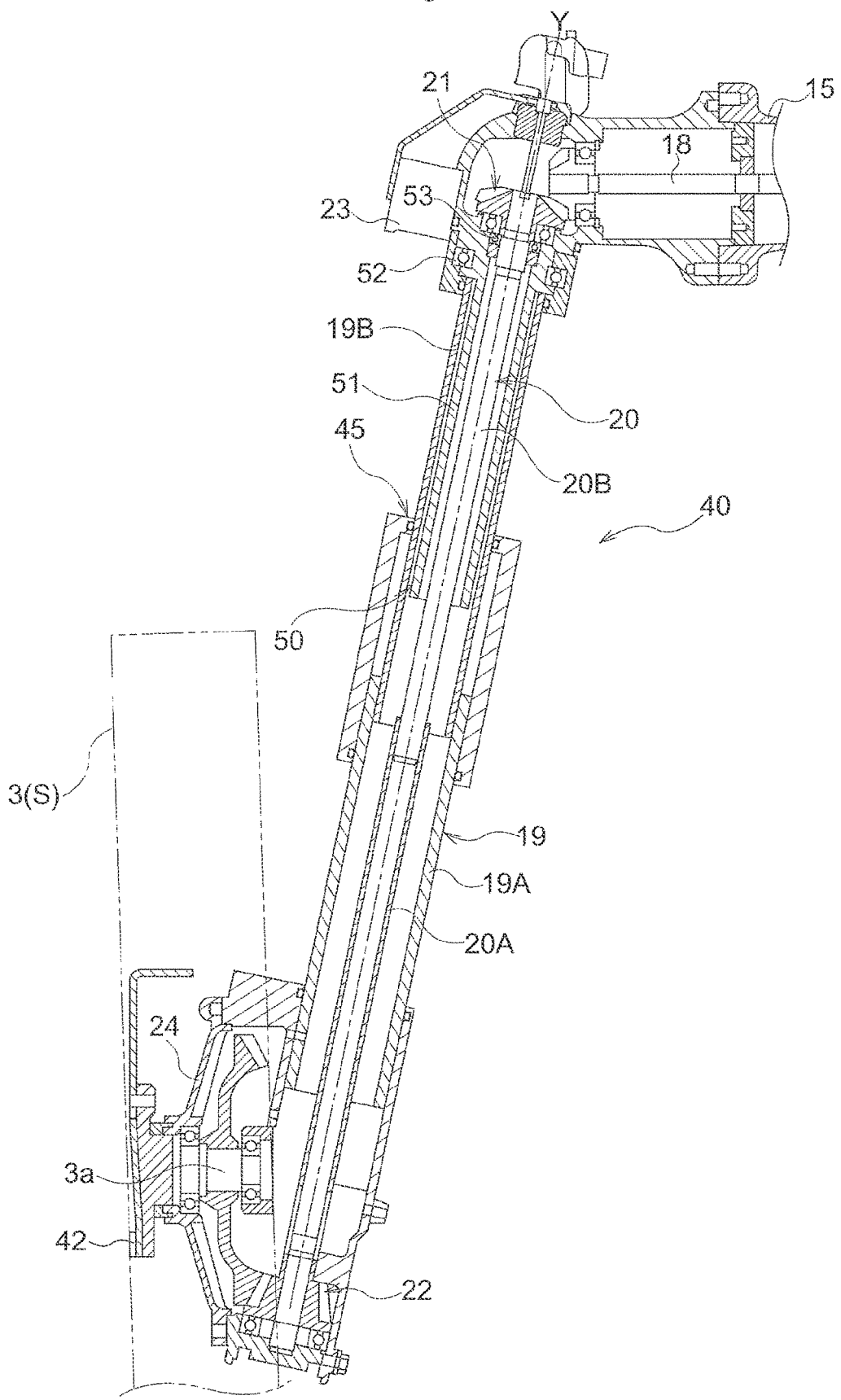
FIG. 6 is a front view in horizontal section of a vehicle height adjustment mechanism under its maximally expanded state.

As shown in FIG. 3, vertically oriented transmission cases 19 as "support members" are connected to the left/right opposed side end portions of the front horizontally oriented transmission case 15. As shown in FIG. 6, inside the vertically oriented transmission case 19, there is provided a vertically oriented transmission shaft 20. An axial end portion of the horizontally oriented transmission shaft 18 included in the front horizontally oriented transmission case 15 is operably coupled with an upper end portion of the vertically oriented transmission shaft 20 via an upper bevel gear mechanism 21. A lower end portion of the vertically oriented transmission shaft 20 and a rotational shaft 3a of the front wheel 3 are operably coupled with each other via a lower bevel gear mechanism 22. The traveling wheel S is supported to the vehicle body frame F to be direction-changeable about a rotational axis Y of the vertically oriented transmission shaft 20.

Chemical Spraying Device

The chemical spraying device 2 includes, as an upper portion thereof, a chemical agent tank 2A for storing chemical agent thereof and includes, on the lower side thereof, a spraying device 2B for spraying the chemical agent downwards. This chemical spraying device 2 is supported to the traveling vehicle body via a link mechanism 2C. The chemical spraying device 2 includes a weight sensor 90 as a "storage amount determining means" for determining the weight of the chemical agent tank 2A. Since the weight of the chemical agent tank 2A decreases in association with progressive consumption of the chemical agent, this changing state can be determined by the weight sensor 90.

Wheel Supporting Arrangement

The wheel supporting arrangement including the vertically oriented transmission case 19 and the vertically oriented transmission shaft 20 is identical for each one of the four traveling wheels S. Therefore, there will be explained next the supporting arrangement for one front wheel 3 as one of them.

Figure 7:
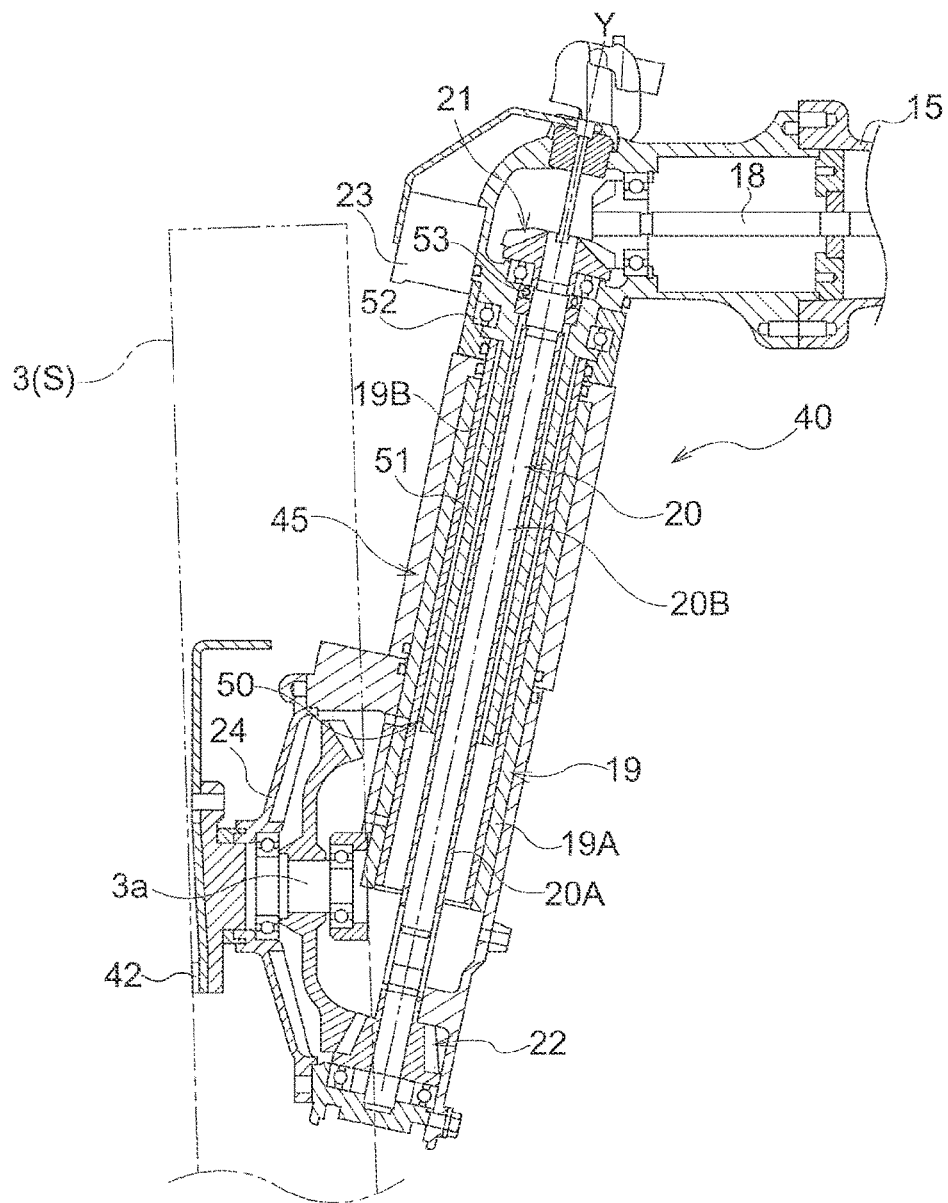
FIG. 7 is a front view in horizontal section of the vehicle height adjustment mechanism under its shortest state.

As shown in FIG. 6, the end portion of the front horizontally oriented transmission case 15 is bent in a curved shape as seen in a front view so as to cover the upper bevel gear mechanism 21 and defines an opening which is opened downwards. An upper connector body 23 integrally coupled to the upper end portion of the vertically oriented transmission case 19 is engaged and connected to an end portion of the front horizontally oriented transmission case 15 so as to pivotable about the rotational axis Y of the vertically oriented transmission shaft 20 to cover the opening. As shown in FIG. 7, to the lower end portion of the vertically oriented transmission case 19, there is connected a wheel support case 24 which covers the lower bevel gear mechanism 22 and supports the rotational shaft 3a of the front wheel 3.

Figure 5:
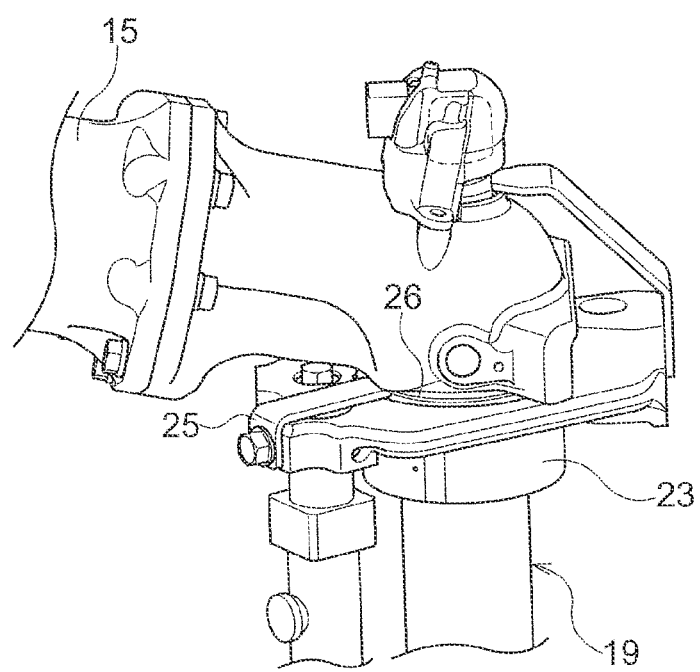
FIG. 5 is a perspective view showing a part of the wheel supporting arrangement.

As shown in FIG. 5, there is provided a stopper tool 25 for preventing inadvertent withdrawal of the upper connector body 23 under its engaged and connected state. As shown in FIG. 5, this stopper tool 25 is formed of a band-plate like member and one end portion thereof is bolt-connected to the outer circumference portion of the upper connector body 23 and the other end portion thereof is engaged with a stepped portion 26 formed at the end portion of the front horizontally oriented transmission case 15, thus preventing the withdrawal.

Figure 4:
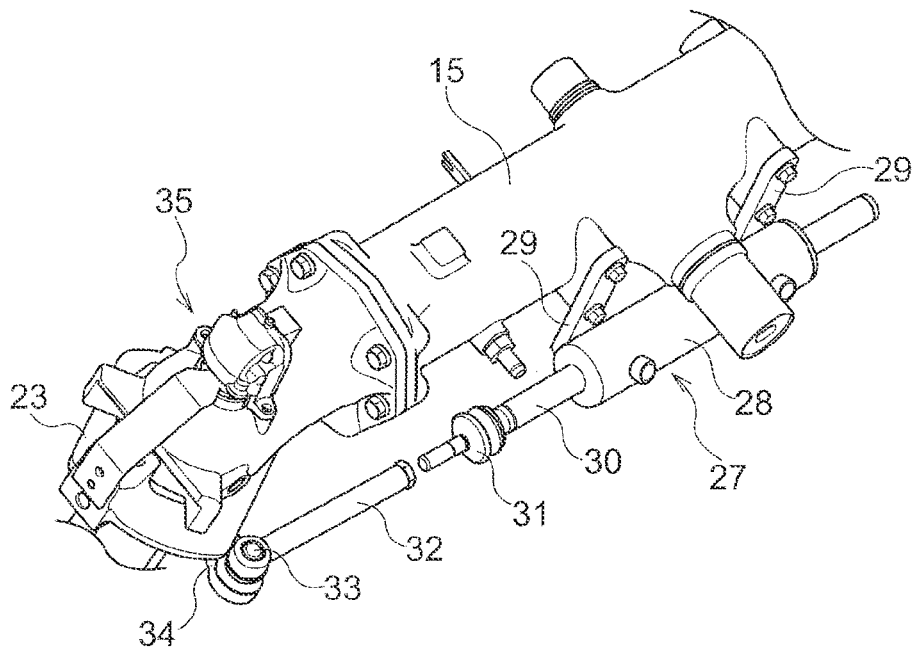
FIG. 4 is a perspective view showing a part of the wheel supporting arrangement.

As shown in FIG. 3 and FIG. 4, a double-action type hydraulic cylinder 27 (to be referred to simply as "steering cylinder" hereinafter) is provided forwardly of the front horizontally oriented transmission case 15 and under a posture parallel with the front horizontally oriented transmission case 15. A cylinder tube 28 of the steering cylinder 27 is coupled to the front horizontally oriented transmission case 15 via brackets 29. A piston rod 30 of the steering cylinder 27 is operably coupled with one end portion of a tie rod 32 via a ball joint 31 and the other end portion of the tie rod 32 is operably coupled with a knuckle arm 34 provided in the upper connector body 23 via a ball joint 33.

As the steering cylinder 27 is operated, via the knuckle arm 34 and the upper connector body 23, the vertically oriented transmission case 19, the wheel support case 24 and the front wheel 3 respectively are pivoted together about the rotational axis Y of the vertically oriented transmission shaft 20, thus effecting a direction changing operation of the front wheel 3. The steering cylinder 27 is switched over in response to a operation of the steering wheel 10 to be slidably operated by oil pressure from the neutral position for straight traveling to either the left direction or the right direction. At the top portion of the end portion of the front horizontally oriented transmission case 15, there is provided a pivot angle detection device 35 for detecting a pivot angle of the upper connector body 23, namely, a pivot angle of the front wheel 3.

By an operation of the steering cylinder 27, the upper connector body 23, namely, the vertically oriented transmission case 19 and the front wheel 3 can be pivoted within a predetermined operational range. The pivot angle of the upper connector body 23 is detected by the pivot angle detection device 35 and this is fed back to a controller 80 (see FIG. 9) which will be described later, so that the steering cylinder 27 will be controlled in such a manner to provide a pivot angle corresponding to the operation of the steering wheel 10. Incidentally, FIG. 9 omits illustration of the control system for steering.

Vehicle Height Adjustment Mechanism

The vertically oriented transmission shaft 20 and the vertically oriented transmission case 19 respectively is configured as an inner/outer double structure which can be expanded/contracted as sliding along the axial direction of the vertically oriented transmission shaft 20. As shown in FIG. 6 and FIG. 7, the vertically oriented transmission case 19 includes an outer tube member 19A and an inner tube member 19B and configured to be expandable/contractable in association with mutual sliding movement of these members. The vertically oriented transmission case 19 is provided with the outer tube member 19A thereof being positioned on the lower side and the inner tube member 19B thereof being positioned on the upper side. The lower end portion of the outer tube member 19A is integrally coupled to the wheel support case 24 and the upper end portion of the inner tube member 19B is integrally coupled to the upper connector body 23.

The vertically oriented transmission shaft 20 includes a tubular shaft 20A and an inner shaft 20B splined to the inner side of the tubular shaft 20A to be slidable relative thereto in the axial direction with maintaining co-rotatable state therewith, so that these can be expanded/contracted in association with the relative sliding movement. The vertically oriented transmission case 19 has its outer tube member 19A located on the lower side and its inner tube member 19B located on the upper side. The upper end portion of the inner shaft 20B is coupled to the upper bevel gear mechanism 21 to be rotatable therewith. The lower end portion of the tubular shaft 20A is coupled to the lower bevel gear mechanism 22 to be rotatable therewith.

There is provided a hydraulic operation type vehicle height adjustment mechanism 40 configured to expand/contract the vertically oriented transmission shaft 20 and the vertically oriented transmission case 19 in the rotational axis Y direction of the vertically oriented transmission shaft 20, thus being able to switch over the relative height of the front wheel 3 relative to the vehicle body frame F in a plurality of steps. As shown in FIG. 3, the vehicle height adjustment mechanism 40 includes a hydraulic cylinder 41 extending in the axial direction of the vertically oriented transmission shaft 20.

The hydraulic cylinder 41 is provided between the upper connector body 23 and a support bracket 42 provided at a lower portion of the wheel support case 24. The upper end portion of a cylinder tube 41A of the hydraulic cylinder 41 is integrally coupled to the upper connector body 23 and the lower end portion of a piston rod 41B of the hydraulic cylinder 41 is integrally coupled to the upper connector body 23. The lower end portion of the piston rod 41B of the hydraulic cylinder 41 is coupled to the wheel support case 24. Thus, the upper connector body 23 and the wheel support case 24 are unitarily coupled to each other via the hydraulic cylinder 41, so that in response to an operation of the steering cylinder 27, these members are pivoted together, thus effecting a turning operation of the front wheel 3.

By expanding/contracting the hydraulic cylinder 41, a varying adjustment is made possible in a long range (e.g. about a few tens of centimeters) between a maximally expanded state as shown in FIG. 6 and a maximally contracted state as shown in FIG. 7. Under the maximally extended state of the vertically oriented transmission case 19, the outer circumference side of an overlapped portion 50 where the outer tube member 19A and the inner tube member 19B are overlapped with each other is supported to a base member 45. In this way, thanks to expansion of the vertically oriented transmission case 19, even when the vertical width of the overlapped portion 50 is small, as the outer circumference side is supported by the base member 45, deterioration in the supporting strength is prevented.

At the end portion of the front horizontally oriented transmission case 15 to which the upper connector body 23 is pivotally connected, a support boss portion 51 which pivotally supports the inner side of the vertically oriented transmission case 19 is provided to be located on the radial inner side of the vertically oriented transmission case 19 to extend downwards along the rotational axis Y direction. Namely, at the end portion of the front horizontally oriented transmission case 15, the support boss portion 51 pivotally supporting the inner circumference side of the upper connector body 23 via a bearing 52 is formed to extend downwards integrally along the axial direction of the vertically oriented transmission shaft 20. This support boss portion 51 pivotally supports, via a bearing 53, the vertically oriented transmission shaft 20 which is located on the inner circumference side.

The support boss portion 51 is provided to extend long downwards to reach a more lower side than the vertical intermediate portion of the inner tube member 19B. In this way, as the vertically oriented transmission case 19 is supported from its inner circumference side by the support boss portion 51 which has such long vertical length, deterioration of the support strength of the vertically oriented transmission case 19 is prevented.

Stroke Sensor

Figure 8:
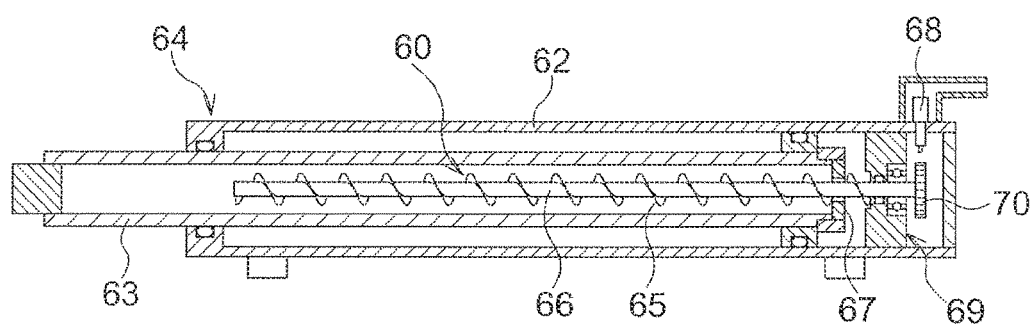
FIG. 8 is a section view showing an arrangement of a stroke sensor.

The hydraulic cylinder 41 is a stroke-sensor incorporated type and as shown in FIG. 8, includes a stroke sensor 60 as an "operation amount detecting means" extending along the longitudinal direction inside the cylinder tube. This stroke sensor 60 is provided between the upper connector body 23 and the support bracket 42 provided at the lower portion of the wheel support case 24.

There is provided a tubular sliding member 64 having a cylinder construction, including an outer tube 62 as a "first member" movable in association with the expanding/contracting operation of the hydraulic cylinder 41 and an inner tube 63 as a "second member" slidably engaged within the outer tube 62, with end portions of the outer tube 62 and the inner tube 63 exposed to the outside being closed to form a closed space. In this tubular sliding member 64, the upper end portion of the outer tube 62 is coupled to the upper connector body 23 and the lower end portion of the inner tube 63 is coupled to the support bracket 42.

Inside the tubular sliding member 64, the stroke sensor 60 is provided. The stroke sensor 60 includes a screw shaft 66 provided to be movable together with the outer tube 62 and having a spiral blade 65 integrally formed at its outer circumference portion, a sliding member 67 configured to come into sliding contact with the spiral blade 65 in association with the relative movement between the inner tube 63 and the outer tube 62 thereby to rotatably guide the screw shaft 66, and an electromagnetic type pickup sensor 68 as a "rotation detection sensor" capable of detecting a rotational speed of the screw shaft 66.

The screw shaft 66 is supported to be movable in unison along the axial direction by a support portion 69 provided at the upper end portion of the outer tube 62 and to be rotatable also in the circumferential direction. The screw shaft 66 extends along the inside of the inner tube 63. At the upper end portion of the inner tube 63, there is provided the sliding member 67 which is inserted on the screw shaft 66 and which slidably contacts the spiral blade 65. At a portion of the screw shaft 66 extending more upwards than the sliding member 67, a detection gear 70 is provided. At the portion corresponding to the outer circumferential portion of the detection gear 70, there is provided the electromagnetic type pickup sensor 68 having a well-known arrangement. Such pickup sensor 68 is widely used in e.g. farming machines or other devices and can detect a rotational speed accurately.

When the outer tube 62 and the inner tube 63 are moved axially relative to each other in association with an expanding/contracting operation of the hydraulic cylinder 41, the spiral blade 65 of the screw shaft 66 is subjected to the sliding contact action from the sliding member 67, whereby the screw shaft 66 is rotated by a rotational amount corresponding the amount of this movement. Then, the pickup sensor 68 can detect the rotational speed of the screw shaft 66 based on a waveform of an electric current generated in association with passage of teeth of the detection gear 70 associated with the rotation of the screw shaft 66. And, by counting the number of rotations of the screw shaft 66 from the start to the end of the rotation, the movement amount of the screw shaft 66 in the axial direction (the expansion/contraction amount of the hydraulic cylinder 41) can be obtained.

Hydraulic Circuit Arrangement

The vehicle height adjustment mechanism 40 is provided by four sets thereof in correspondence with the four traveling wheels S respectively. Next, there will be explained a hydraulic circuit arrangement for controlling operations of the four hydraulic cylinders 41 provided in the four sets of the vehicle height adjustment mechanisms 40.

Figure 10:
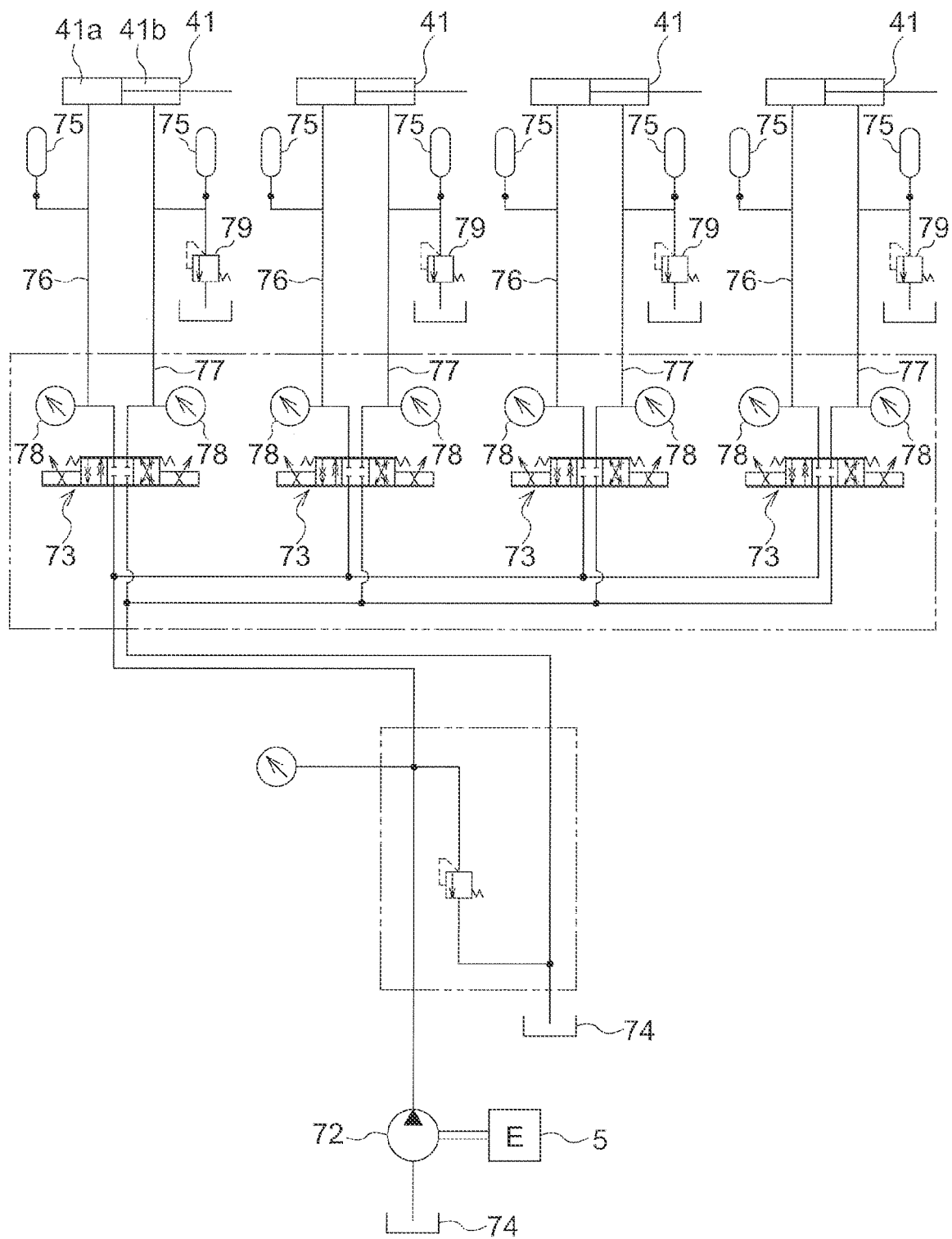
FIG. 10 is a hydraulic circuit diagram.

FIG. 10 shows the hydraulic circuits for the respective hydraulic cylinder 41. There is provided a hydraulic pump 72 which is driven by the engine 5. In four branch passages to which work oil is fed in distribution from the hydraulic pump 72, there are respectively provided hydraulic control valves 73 capable of controlling feeding states of the work oil to the hydraulic cylinders 41 independently. Each hydraulic cylinder 41 is constituted of a double-action cylinder.

The hydraulic control valve 73 slidably operates its spool by an electromagnetic operational force to switch over among an elevated position for expanding the hydraulic cylinder 41, a lowered position for contracting the hydraulic cylinder 41, and a neutral position for stopping the operation. The hydraulic control valve 73 is constituted of an electromagnetic proportional type flow control valve capable of variably adjusting the work oil amount to be fed to the hydraulic cylinder 41 in the expanding operation and the contracting operation, respectively.

When the hydraulic control valve 73 is switched to the elevated position, the work oil from the hydraulic control valve 73 is feed to a bottom side oil chamber 41a and the work oil is discharged from a rod side oil chamber 41b into a drain tank 74, whereby the oil cylinder 41 is expanded. When the hydraulic control valve 73 is switched to the lowered position, the work oil from the hydraulic control valve 73 is fed to the rod side oil chamber 41b and the work oil is discharged from the bottom side oil chamber 41a to the drain tank 74, whereby the hydraulic cylinder 41 is contracted.

For the bottom side oil chamber 41a and the rod side oil chamber 41b of each hydraulic cylinder 41 respectively, accumulators 75 are provided. Specifically, the accumulators 75 are connected to a bottom side work oil feeding passage 76 in which the work oil is fed from the hydraulic control valve 73 to the bottom side oil chamber 41a of the hydraulic cylinder 41 and to a rod side work oil feeding passage 77 in which the work is fed from the hydraulic control valve 73 to the rod side oil chamber 41b of the hydraulic cylinder 41. Therefore, such accumulators 75 are provided by two for each hydraulic cylinder 41, i.e. by eight in total.

When there occurs a sharp pressure rise in the oil chamber of the hydraulic cylinder 41, the accumulator 75 can absorb and accumulate the excess work oil. When there occurs a sharp pressure drop in the oil chamber, the accumulator 75 can discharge accumulated work oil. With such movements, the accumulator 75 can absorb sharp pressure variations due to such external load such as vertical vibration of the traveling wheel S due to fine unevenness present on the ground surface. As a result, by such accumulation or discharge of the work oil by the accumulator 75, it is possible to allow relative stroke variation of the hydraulic cylinder 41 along the small unevenness of the ground surface, thus preventing vibration of the vehicle body.

The bottom side work oil feeding passage 76 and the rod side work oil feeding passage 77 respectively incorporates a pressure sensor 78 capable of determining an inside pressure. The inside pressures of these work oil feeding passages are equal to the pressures of the oil chambers of the hydraulic cylinders 41. Therefore, the pressure sensor 78 can determine the pressure of the oil chamber of the hydraulic cylinder 41 (the bottom side oil chamber 41a or the rod side oil chamber 41b). Such pressure sensors 78 are provided by two for each hydraulic cylinder 41, thus, by eight in total.

To the rod side work oil feeding passage 77, a relief valve 79 is connected. This relief valve 77 is configured to flow the work oil to the drain tank 74 when the inside pressure of the rod side work oil feeding passage 77 (the rod side oil chamber 41b) exceeds a permissible value, thus preventing the pressure from exceeding the permissible value. Feeding of the work oil to the rod side oil chamber 41b is effected when the hydraulic cylinder 41 is contracted (when the vehicle body is lowered), and when the hydraulic cylinder 41 is being operated to lower the vehicle body, there is a risk of the pressure of the oil chamber being excessive because of addition thereto of an urging force due to the weight of the vehicle body. For this reason, by discharging the work oil by the relief valve 79, it is possible to avoid the pressure becoming excessive.

Control Arrangement

Next, there will be explained a control arrangement for controlling the hydraulic cylinder 41.

Figure 9:
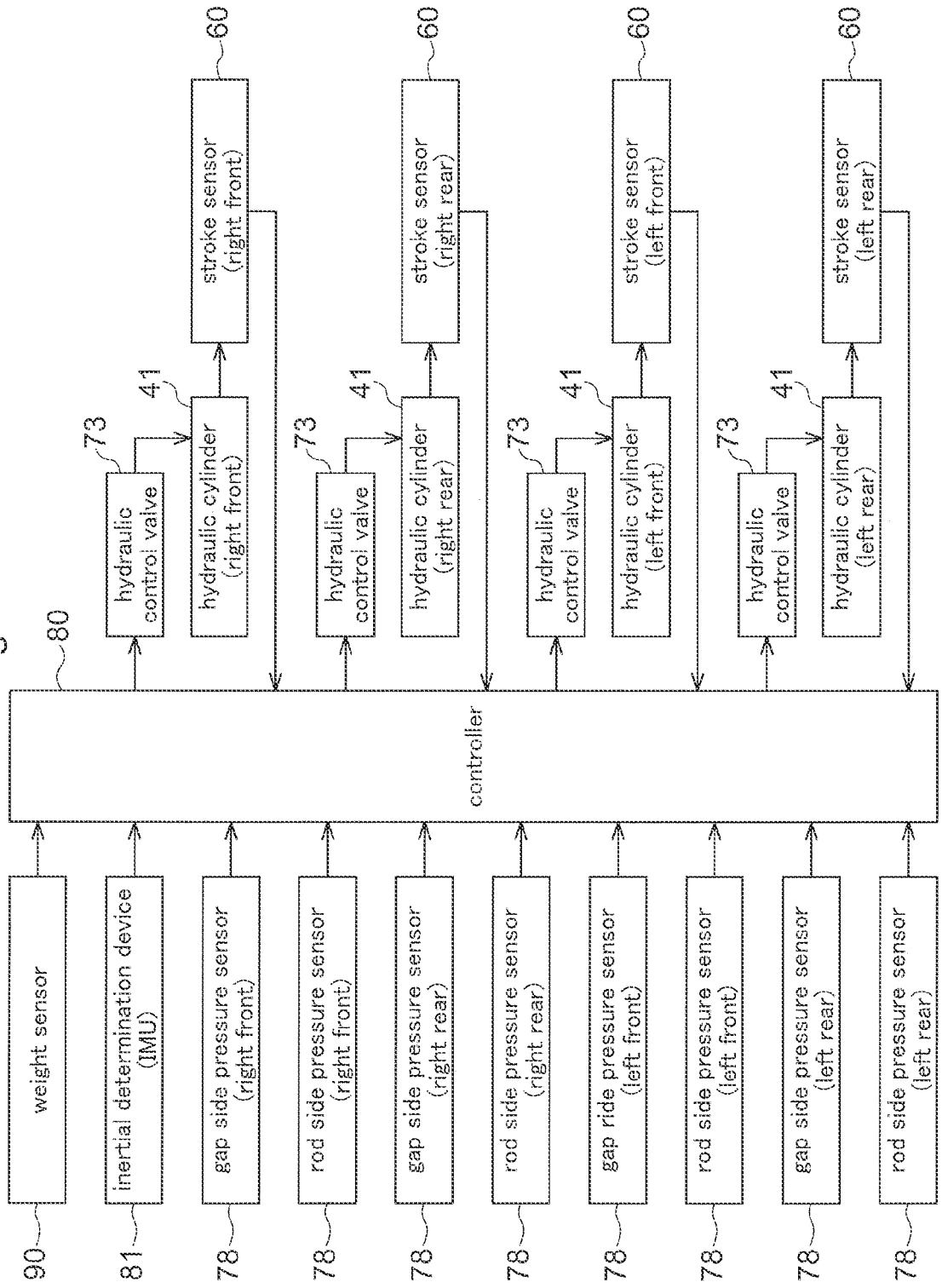
FIG. 9 is a control block diagram.

As shown in FIG. 9, in addition to the weight sensor 90 included in the chemical spraying device 2, the four hydraulic control valves 73, the four stroke sensors 60 and the eight pressure sensors 78, there are provided a controller 80 as a "controlling section" for controlling the operations of the respective hydraulic control valves 73, and an inertial measurement unit (IMU: Inertial Measurement Unit) 81 capable of determining a posture change state of the vehicle body. Detection information of the stroke sensors 60, the pressure sensors 78 and the inertial determination device 81 are inputted to the controller 80. The controller 80 is constituted with inclusion of a microcomputer and is capable of executing various control operations.

The inertial determination device 81 is used generally for determining behaviors of moving bodies, and though not shown, includes a three-axis gyro and a three-direction acceleration sensor and is capable of obtaining a three-dimensional angular velocity and acceleration. And, with a mathematical processing such as integration of such detection information, a change state of the vehicle body, specifically, e.g. a tilt angle of the vehicle body from a horizontal posture, a front/rear tilt angle, etc. can be obtained. Therefore, this inertial determination device 81 functions as a "tilt sensor" for determining a tilted state of the vehicle body.

The controller 80 controls the operation of the respective hydraulic control valve 73 in response to a posture variation of the vehicle body such that the vehicle may be brought into a target state by vehicle height adjustment by the hydraulic cylinders 41. Namely, based on the detection results of the weight sensor 90, the inertial determination device 81 and the respective stroke sensors 60, the controller 80 obtains target pressures for the respective hydraulic cylinders 41 required for bringing the vehicle body to a target ground clearance and target posture and executes a pressure adjustment control for controlling the operations of the hydraulic control valves 73 such that the detection results of the pressure sensors 78 may become the target pressures.

Figure 11:
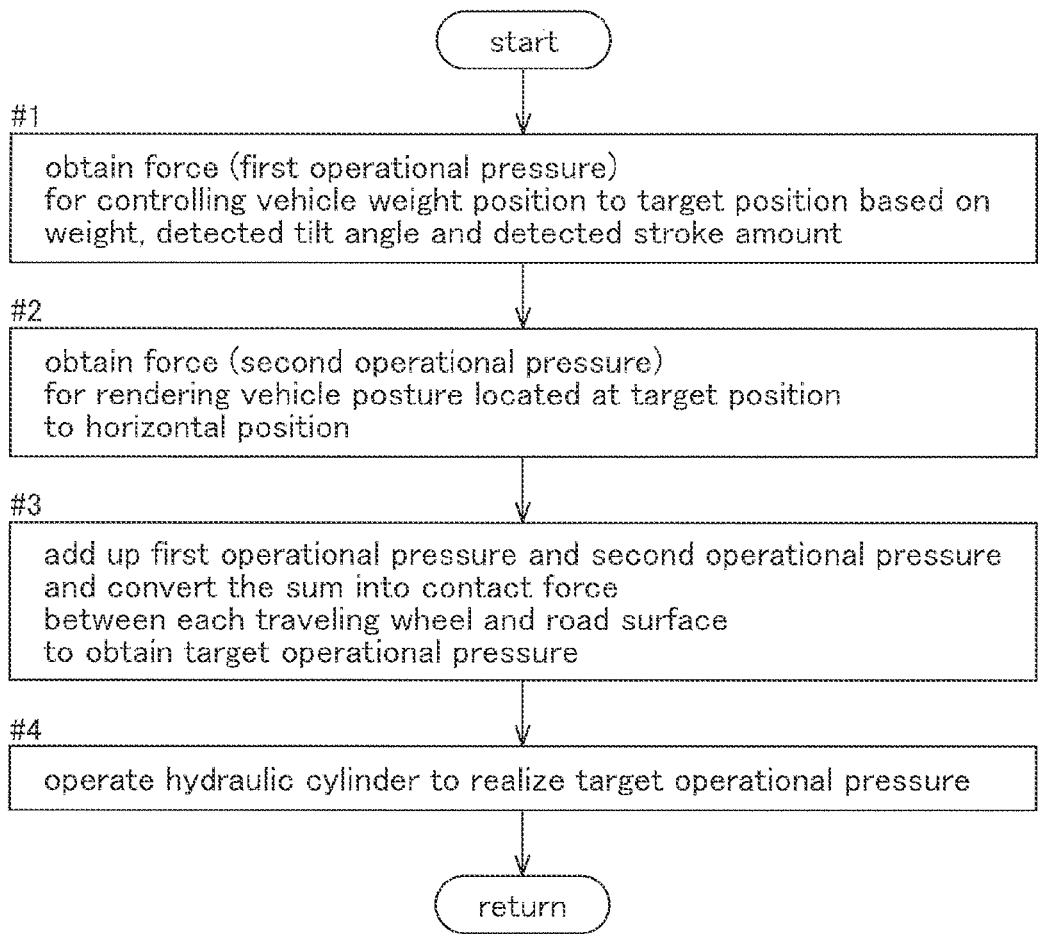
FIG. 11 is a flowchart of control operations.

The controller 80, as shown in FIG. 11, obtains a left/right tilt angle and a front/rear tilt angle of the vehicle body from the horizontal posture based on the determination result of the inertial determination device 81; and then, based on the detection result of such detected tilt angles and detection information of the four stroke sensors 60 (detected stroke amounts) and the detection result of the weight sensor 90, the controller 80 obtains values (first operational pressure) to render the pressures of the hydraulic cylinders 41 to operational pressures needed to control to bring the vehicle gravity center position G to the target position (target ground clearance) and to stabilize the weight balance of the vehicle body (step #1). Next, the controller 80 obtains by calculation forces (second operational pressures) of the hydraulic cylinders 41 needed to bring the posture of the vehicle (front/rear direction and left/right direction) when the vehicle gravity center position G is located at the target position to the horizontal posture and to stabilize the weight balance of the vehicle body (step #2).

Such first operational pressure and second operational pressure correspond to forces (propulsion forces) needed to operate the hydraulic cylinder 41 by a required stroke amount. And, a value obtained by addition of the first operational pressure to the second operational pressure is converted into a contact force between each traveling wheel S and the ground surface and obtained as a target operational pressure (step #3) and controls the operation of each hydraulic control valve 73 such that the pressure detected by the corresponding pressure sensor 78 may become the pressure corresponding to the target operational pressure (step #4).

Namely, rather than obtaining a target operational pressure simply based on the detection information of detected tilt angles and detected stroke amount, the arrangement obtains the target operational pressure with taking into consideration difference in the behavior of the posture variation due to change of the weight of the chemical agent. For instance, the greater the weight, the greater the weight of the rear side. So, the target operational pressures will be set higher for the hydraulic cylinders located on the vehicle body rear side, than for the hydraulic cylinders located on the vehicle body front side.

Such process of obtaining the target operational pressure as described above and controlling the hydraulic control valve 73 accordingly is carried out repeatedly for each set unit time period in association with a variation occurring in the posture of the vehicle body. As a result, it becomes possible to maintain the vehicle body at the target ground clearance and under the target posture.

With the above-described arrangement, in such cases as a case of the road surface on which the vehicle body travels being a sloped land, a case of traveling over a ridge to enter a work land or a case of exiting to a ridge road from a work land by traveling over a ridge, etc., by executing the above-described pressure adjustment control, it is possible to maintain the vehicle body at the target ground clearance and under the target posture.

And, in such a case when the road surface traveled on by the vehicle body is generally flat surface, but some small unevenness is present therein, vibration of the vehicle body is suppressed by allowing relative vertical movement of the traveling wheel S by the action of the accumulator 75, so that the posture of the vehicle body can be maintained under the target posture.

Further, as the controller 80 executes the pressure adjustment control for controlling the operation of the hydraulic control valve 73 based on the detection value of the pressure sensor 78, even if there occurs relative vertical movement of the traveling wheel S due to the action of the accumulator 75, this will hardly lead to occurrence of the hunting phenomenon during the control operation, so the posture control can proceed smoothly. In this embodiment, the stroke sensor 60, the pressure sensor 78, the inertial determination device 81 correspond to "variation state determining means" for determining variation sates from the target ground clearance and the target posture of the vehicle body.

With the riding work vehicle having the above-described configuration, it is possible to allow vertical movement of the ground clearance of the vehicle body over a wide range. For instance, as shown in FIG. 12 (a), (b), it is possible to switch over between a low posture state where the four hydraulic cylinders 41 are made short respectively and a high posture state where the four hydraulic cylinders 41 are made long respectively. When a work is to be carried out astride agricultural produces or the agricultural produces have low profiles, it is possible to switch over to the low posture state, so that chemical agent can be sprayed at a low position. Whereas, if the agricultural produces have grown to have high profiles, it is possible to switch over to the high posture, so that no damage will be given to the agricultural produces. Further, as shown in FIG. 12 (*c*), if the road surface is significantly tilted in the left/right direction and a work traveling is to be effected along this tilted surface, the hydraulic cylinders 41 on the lower side of the tilt will be expanded long whereas the hydraulic cylinders 41 on the upper side of the tilt will be made short. With this, traveling is made possible with keeping the vehicle body under the horizontal posture or a nearly horizontal posture.

Second Embodiment

Next, a second embodiment of the work vehicle relating to the present invention will be explained with reference to the accompanying drawings.

This embodiment differs from the first embodiment in the arrangement of the controller 80, but the other arrangements thereof are identical to those of the first embodiment. Thus, in the following, only the difference from the first embodiment will be explained, and explanation will be omitted for the identical arrangements.

In this embodiment, the controller 80 obtains a target operational amount for the hydraulic cylinder 41 required for bringing the vehicle body to a target ground clearance and a target posture and to stabilize the weight balance of the vehicle body, based on detection results of the inertial determination device 81 (tilt sensor) and detection result of the stroke sensor 60, and executes vehicle height adjustment control such that the detection result of the stroke sensor 60 may become the target operational amount and also in the course of the execution of the vehicle height adjustment control, the controller 80 executes a correction process of correcting the target operational amount in accordance with a variation occurring in the pressure detected by the pressure sensor 78.

The controller 80, as shown in FIG. 13, obtains a left/right tilt angle and a front/rear tilt angle of the vehicle body, based on the detection result of the inertial determination device 81; and based on the detection result of such detected tilt angles and information of the detection results of the four stroke sensors 60 (detected stroke amounts), the controller 80 obtains road surface slope state (step #11). Next, the controller 80 obtains target stroke amounts required to render the vehicle gravity center position G to the target height and to stabilize the weight balance of the vehicle body (step #12) and controls the operations of the hydraulic control valves 73 so that the actual stroke amounts of the hydraulic cylinders 41 may become the target stroke amount (step #13). This control corresponds to the vehicle height adjustment control.

Namely, rather than obtaining a target operational pressure simply based on the detection information of detected tilt angles and detected stroke amount, the arrangement obtains the appropriate stroke amount with taking into consideration difference in the behavior of the posture variation due to change of the weight of the chemical agent.

For instance, the greater the weight, the greater the weight of the rear side. So, the target operational pressures will be set higher for the hydraulic cylinders located on the vehicle body rear side than for the hydraulic cylinders located on the vehicle body front side.

In the vehicle height adjustment control, specifically, in correspondence with a deviation between the actual stroke amount and the target stroke amount, the work oil flow amount for the hydraulic cylinder 41 will be set such that the greater the deviation, the greater the operational speed, thus controlling the operation of the hydraulic control valve 73. Further, in the actual operation, a dead zone of a predetermined range will be set for the target stroke amount. With this, even in the case of a speedy operation for the expansion amount to be provided, it is possible to prevent the hunting phenomenon due to occurrence of overshoot or the like. Incidentally, in the case of a small deviation, the expansion amount to be provided is small, so that it will progressively converge to the target stroke amount.

And, in the course of execution of the vehicle height adjustment control, based on the detection result of the pressure sensor 78, the process obtains an external force applied to any one hydraulic cylinder 41 (step #14). If relatively large protrusions or recesses are present in the road surface and if any one traveling wheel rides over such protrusion, this results in increase in the ground contact pressure, which renders the pressure of the oil chamber of this particular hydraulic cylinder 41 higher than those of the other hydraulic cylinders 41. On the other hand, if the wheel falls into a recess, this conversely will result in decrease of the ground contact pressure and corresponding decrease in the pressure of the oil chamber of this particular hydraulic cylinder 41.

Then, the target stroke amount for the hydraulic cylinder 41 whose pressure has been changed will be corrected, with taking into such external force into consideration (step #15). This process corresponds to the correction process. For instance, when the pressure increases, the target stroke amount will be corrected to shorter stroke side. When the pressure decreases, the target stroke amount will be corrected to longer stroke side. And, the operation of the hydraulic control valve 73 will be controlled to operate the hydraulic cylinder 41 to obtain such corrected target stroke amount (step #16).

With such control as described above, irrespectively of unevenness if any in the road surface, traveling with the four traveling wheels S kept in contact with the ground surface is made possible. Thus, such inconvenience as slippage or floating of the traveling wheels S off the ground surface causing idle rotation can be avoided.

Third Embodiment

Next, a third embodiment of a work vehicle relating to the present invention will be explained with reference to the accompanying drawings.

This embodiment differs from the first embodiment in the arrangement of the controller 80, but the other arrangements thereof are identical to those of the first embodiment. Thus, in the following, only the difference from the first embodiment will be explained, and explanation will be omitted for the identical arrangements.

In this embodiment, the controller 80, as shown in FIG. 14, obtains a left/right tilt angle and a front/rear tilt angle of the vehicle body from the detection result of the inertial determination device 81; and then based on the detection information of such detected tilt angles and the detection result (detected stroke amounts) of the four stroke sensors 60, the controller 80 obtains a road surface slope state (step #21). Next, the controller 80 obtains target stroke amounts required for rendering the vehicle gravity center position G to the target height and to stabilize the weight balance of the vehicle body (step #22) and controls the operations of the hydraulic control valves 73 such that the actual stroke amounts of the hydraulic cylinders 41 may become the target stroke amount (step #23). This control corresponds to the vehicle height adjustment control, and control similar to that explained in the second embodiment above is carried out.

Namely, rather than obtaining target stroke amounts simply based on the detection information of the detected tilt angles and detected stroke amounts, the arrangement obtains appropriate target stroke amounts with taking into consideration difference in the behavior of the posture variation due to change of the weight of the chemical agent.

For instance, the greater the weight, the greater the weight of the rear side. So, the target operational pressures will be set higher for the hydraulic cylinders 41 located on the vehicle body rear side than for the hydraulic cylinders 41 located on the vehicle body front side.

In this embodiment, the vehicle height adjustment control is executed based solely on the tilt information of the vehicle body and the information of the stroke amounts, and in this embodiment, the pressure sensor 78 is not needed, so that the control arrangement may be simple, thus making cost reduction possible. Therefore, in this embodiment, the stroke sensor 60 and the inertial determination device 81 correspond to the "variation state measuring means" for measuring a variation state of the vehicle body from the target ground clearance and the target posture.

Fourth Embodiment

Next, a fourth embodiment of a work vehicle relating to the present invention will be explained with reference to the accompanying drawings.

As shown in FIG. 15, this embodiment differs from the foregoing embodiments in that a traveling state detection section 91 for detecting a traveling state of the vehicle body is provided in place of the weight sensor 90 and differs also in the arrangement of the controller 80, but the other arrangements are identical to those of the foregoing embodiments. Therefore, in the following, only the differences will be explained and explanation on the other arrangements will be omitted.

The traveling state detection section 91 is provided for detecting a traveling state of the vehicle body, specifically detecting whether the vehicle body is making a sudden start or not, or whether the vehicle body is making a sudden stop or not or whether the vehicle body is making a turning traveling or not, or detecting one or two or more of these.

Though not shown, the controller 80 executes basically any one or more of the pressure adjustment control of the first embodiment, the vehicle height adjustment control and the correction process of the second embodiment and the vehicle height posture control of the third embodiment. And, in the execution of the pressure adjustment control, detection information of the traveling state detection section 91 is employed, instead of the detection information of the weight sensor 90 to obtain target operational pressures needed for stabilizing the traveling state.

Namely, rather than obtaining target stroke amounts simply based on the detection information of the detected tilt angles and detected stroke amounts, the arrangement obtains appropriate target stroke amounts with taking into consideration difference in the behavior of the posture variation due to change of the weight of the chemical agent.

Further, when executing the vehicle height adjustment control of the second embodiment and the third embodiment, detection information of the traveling state detection section 91 is employed, instead of the detection information of the weight sensor 90 to obtain target operational pressures needed for stabilizing the traveling state.

Namely, rather than obtaining target stroke amounts simply based on the detection information of the detected tilt angles and detected stroke amounts, the arrangement obtains appropriate target stroke amounts with taking into consideration difference in the behavior of the posture variation due to change of the weight of the chemical agent.

Other Embodiments (1) In the foregoing embodiments, the weight sensor 90 or the traveling state detection section 91 was provided. In place of this, in the case of an arrangement allowing replacement by an implement having a different working width, an identification device for identifying the type of implement may be provided; and based on detection result of such identification device, target operational amounts or target operational pressures for stabilizing the weight balance of the vehicle body may be obtained.

(2) In the foregoing embodiments, the stroke sensor 60 was incorporated within the hydraulic cylinder 41. In place of this, it may be provided outside the hydraulic cylinder 41.

(3) In the foregoing embodiments, the pressure sensors 78 were provided respectively for the bottom side oil chamber 41a and the rod side oil chamber 41b of each hydraulic cylinder 41. In place of this, it may be provided for only one of the bottom side oil chamber 41a and the rod side oil chamber 41b.

(4) In the foregoing embodiments, the accumulators 75 were provided respectively to the bottom side oil chamber 41a and the rod side oil chamber 41b of each hydraulic cylinder 41. In place of this, it may be provided for only one of the bottom side oil chamber 41a and the rod side oil chamber 41b. Further alternatively, such accumulator(s) 75 may be omitted at all.

(5) In the foregoing embodiments, as the storage amount determining means, the weight sensor 90 for determining the weight as the storage amount of the chemical agent as the "load" was provided. In place of this, there may be provided a sensor for obtaining the volume of the chemical agent. Or, the load is not limited to such chemical agent, but may be fuel or an agricultural produce to be planted in the field or an agricultural produce to be harvested.

(6) In the foregoing embodiments, the inertial determination device (IMU) was employed as a tilt sensor. In place of this, various types or kinds of tilt sensors such as a weight type tilt sensor or a liquid level detection type tilt sensor may be employed.

(7) In the foregoing embodiments, as an implement, a chemical spraying device 2 was provided at a rear portion of the traveling vehicle body 1. This implement may alternatively be various other kinds of implement such as a fertilization device, etc. Further, such implement may be provided at a position located at the front/rear intermediate position between the front wheels 3 and the rear wheels 4 of the traveling vehicle body 1. In such arrangement, a large chemical tank may be employed for allowing continuation of the utility work for an extended period of time.

INDUSTRIAL APPLICATION

The present invention is applicable to a work vehicle having a plurality of traveling wheels.

DESCRIPTION OF SIGNS

9: driver's seat
10: steering wheel (operational member)

19: support member
40: vehicle height adjustment mechanism
41: hydraulic cylinder
41a: bottom side oil chamber
41b: rod side oil chamber
60: stroke sensor
73: hydraulic control valve
75: accumulator
78: pressure sensor
80: controller
81: inertial measurement device (tilt sensor)
91: traveling state detection section
F: vehicle body frame
S: traveling wheel

The invention claimed is:

1. A work vehicle comprising:
a plurality of traveling wheels supported via expandable and contractible tubular support members to a vehicle body frame;
a hydraulic operation type vehicle height adjustment mechanism provided for each one of the traveling wheels, the vehicle height adjustment mechanism capable of switching a relative height of the traveling wheel relative to the vehicle body frame within a predetermined length range by expanding and contracting the support member by a hydraulic cylinder;
a hydraulic control valve capable of controlling feeding state of work oil to each one of the plurality of hydraulic cylinders;
a controlling section for controlling an operation of the hydraulic control valve to bring the vehicle body to a target state via vehicle height adjustment by the hydraulic cylinder in response to a change in the posture of the vehicle body;
a tilt sensor for determining a tilt angle of the vehicle body; and
a plurality of stroke sensors for determining expansion and contraction amounts of the respective plurality of hydraulic cylinders.

2. The work vehicle of claim 1, further comprising a pressure sensor for determining a pressure of the oil chamber of the respective plurality of hydraulic cylinders.

3. The work vehicle of claim 1 further comprising:
a plurality of accumulators connected to oil chambers of the respective plurality of hydraulic cylinders,
wherein the hydraulic cylinders are double-action cylinders,
wherein the accumulator is provided for a bottom-side oil chamber and a rod-side oil chamber, respectively, of the hydraulic cylinder, and
wherein the hydraulic control valve is a flow control valve capable of variably adjusting a feed flow amount of work oil to the hydraulic cylinder.

4. A work vehicle comprising:
a plurality of traveling wheels supported via expandable and contractible tubular support members to a vehicle body frame;
a hydraulic operation type vehicle height adjustment mechanism provided for each one of the traveling wheels, the vehicle height adjustment mechanism capable of switching a relative height of the traveling wheel relative to the vehicle body frame within a predetermined length range by expanding and contracting the support member by a hydraulic cylinder;
a hydraulic control valve capable of controlling feeding state of work oil to each one of the plurality of hydraulic cylinders;
a controlling section for controlling an operation of the hydraulic control valve; and
a variation state determiner for determining variation states of the vehicle body from a target ground clearance and from a target posture;
wherein the controlling section controls operations of the hydraulic control valves to bring the vehicle body into the target ground clearance and the target posture, based on determination result of the variation state determiner.

5. The work vehicle of claim 4, wherein:
the variation state determiner comprises a tilt sensor for determining a tilt angle of the vehicle body and a stroke sensor for determining an expansion and contraction amount of the hydraulic cylinder; and
the controlling section obtains a target operation amount of the hydraulic cylinder for bringing the vehicle body to the target ground clearance and the target posture, based on detection results of the tilt sensor and the stroke sensor and executes vehicle height posture control for controlling the operation of the hydraulic control valve such that detection value of the stroke sensor may become the target operation amount.

6. The work vehicle of claim 4, wherein:
the variation state determiner comprises:
a tilt sensor for determining a tilt angle of the vehicle body;
a stroke sensor for determining an expansion and contraction amount of the hydraulic cylinder; and
a pressure sensor for determining a pressure of the oil chamber of the hydraulic cylinder; and
the controlling section obtains a target pressure for the hydraulic cylinder required to bring the vehicle body to a target ground clearance and a target posture and, based on detection results of the tilt sensor and the stroke sensor, the controlling section executes pressure adjustment control for controlling operation of the hydraulic control valve such that detection value of the pressure sensor may become the target pressure.

7. The work vehicle of claim 4, wherein:
the variation state determiner comprises:
a tilt sensor for determining a tilt angle of the vehicle body;
a stroke sensor for determining an expansion and contraction amount of the hydraulic cylinder; and
a pressure sensor for determining a pressure of an oil chamber of the hydraulic cylinder; and
the controlling section obtains a target operation amount for the hydraulic cylinder for bringing the vehicle body to the target ground clearance and the target posture, based on detection results of the tilt sensor and the stroke sensor and executes vehicle height adjustment control for controlling an operation of the hydraulic control valve and corrects the target operation amount based on variation of pressure determined by the pressure sensor at time of execution of the vehicle height adjustment control.

8. A work vehicle comprising:
a plurality of traveling wheels supported via expandable and contractible tubular support members to a vehicle body frame;
a hydraulic operation type vehicle height adjustment mechanism provided for each one of the traveling wheels, the vehicle height adjustment mechanism capable of switching a relative height of the traveling wheel relative to the vehicle body frame within a predetermined length range by expanding and contracting the support member by a hydraulic cylinder;
a load accommodation device mounted and supported on the vehicle body, the load accommodation device accommodating a load whose weight varies in association with continuation of a work;
a hydraulic control valve capable of controlling feeding state of work oil to each one of the plurality of hydraulic cylinders;
a controlling section for controlling an operation of the hydraulic control valve; and
an accommodation amount determiner for determining an accommodation amount of the load;
wherein the controlling section obtains a target operation amount for the hydraulic cylinder required for stabilizing a weight balance of the vehicle body based on determination result of the accommodation amount determiner and controls operation of the hydraulic control valve so that an operation amount of the hydraulic cylinder may become the target operation amount.

9. The work vehicle of claim 8, further comprising:
a tilt sensor for determining a tilt angle of the vehicle body; and
a stroke sensor for determining an expansion and contraction amount of the hydraulic cylinder;
wherein the controlling section obtains a target operation amount for the hydraulic cylinder for bringing the vehicle body to the target ground clearance and the target posture and required for stabilizing a weight balance of the vehicle body, based on detection result of the accommodation amount determiner and based on detection results of the tilt sensor and the stroke sensor and executes vehicle height posture control for controlling operation of the hydraulic control valve such that detection value of the stroke sensor may become the target operation amount.

10. The work vehicle of claim 1, further comprising:
a tilt sensor for determining a tilt angle of the vehicle body; and
a stroke sensor for determining an expansion and contraction amount of the hydraulic cylinder;
wherein the controlling section obtains a target operation amount for the hydraulic cylinder for bringing the vehicle body to the target ground clearance and the target posture and required for stabilizing a weight balance of the vehicle body, based on detection results of the tilt sensor and the stroke sensor and executes vehicle height posture control for controlling operation of the hydraulic control valve such that detection value of the stroke sensor may become the target operation amount.

11. The work vehicle of claim 9, further comprising:
a traveling state detection section for detecting a traveling state; and
wherein the controlling section obtains the target operation amount for the hydraulic cylinder required for stabilizing the traveling state based on detection result of the traveling state detection section and on detection results of the tilt sensor and the stroke sensor, and executes the vehicle height posture control for controlling operation of the hydraulic control valve such that the detection value of the stroke sensor may become the target operation amount.

12. The work vehicle of claim 8, further comprising:
a pressure sensor for determining a pressure of an oil chamber of the hydraulic cylinder: and
wherein the controlling section corrects the target operation amount in accordance with variation in the pressure determined by the pressure sensor, in the course of controlling the operation of the hydraulic control valve such that the operation amount of the hydraulic cylinder may become the target operation amount.

13. The work vehicle of claim 1, further comprising:
a driver's seat at which a driver is to be seated; and
an operational member disposed forwardly of the driver's seat.

14. The work vehicle of claim 2, further comprising:
a plurality of accumulators connected to oil chambers of the respective plurality of hydraulic cylinders,
wherein the hydraulic cylinders are double-action cylinders,
wherein the accumulator is provided for a bottom-side oil chamber and a rod-side oil chamber, respectively, of the hydraulic cylinder, and
wherein the hydraulic control valve is a flow control valve capable of variably adjusting a feed flow amount of work oil to the hydraulic cylinder.

15. The work vehicle of claim 2, further comprising:
a variation state determiner for determining variation states of the vehicle body from a target ground clearance and from a target posture;
wherein the controlling section controls operations of the hydraulic control valves to bring the vehicle body into the target ground clearance and the target posture, based on determination result of the variation state determiner.

16. The work vehicle of claim 3, further comprising:
a variation state determiner for determining variation states of the vehicle body from a target ground clearance and from a target posture;
wherein the controlling section controls operations of the hydraulic control valves to bring the vehicle body into the target ground clearance and the target posture, based on determination result of the variation state determiner.

17. The work vehicle of claim 10, further comprising:
a traveling state detection section for detecting a traveling state; and
wherein the controlling section obtains the target operation amount for the hydraulic cylinder required for stabilizing the traveling state based on detection result of the traveling state detection section and on detection results of the tilt sensor and the stroke sensor, and executes the vehicle height posture control for controlling operation of the hydraulic control valve such that the detection value of the stroke sensor may become the target operation amount.

\* \* \* \* \*